(12) United States Patent
Klenk et al.

(10) Patent No.: US 11,502,867 B2
(45) Date of Patent: Nov. 15, 2022

(54) INJECTION LIMITING AND WAVE SYNCHRONIZATION FOR SCALABLE IN-NETWORK COMPUTATION

(71) Applicant: NVIDIA Corporation, Santa Clara, CA (US)

(72) Inventors: Benjamin Klenk, San Jose, CA (US); Nan Jiang, Santa Clara, CA (US); Larry Robert Dennison, Menden, MA (US)

(73) Assignee: NVIDIA Corporation, Santa Clara, CA (US)

( * ) Notice: Subject to any disclaimer, the term of this patent is extended or adjusted under 35 U.S.C. 154(b) by 144 days.

(21) Appl. No.: 16/938,044

(22) Filed: Jul. 24, 2020

(65) Prior Publication Data

US 2021/0036881 A1    Feb. 4, 2021

Related U.S. Application Data

(60) Provisional application No. 62/881,528, filed on Aug. 1, 2019.

(51) Int. Cl.
*H04L 12/18* (2006.01)
*G06F 9/50* (2006.01)
(Continued)

(52) U.S. Cl.
CPC ........ *H04L 12/1886* (2013.01); *G06F 9/5083* (2013.01); *H04L 12/18* (2013.01);
(Continued)

(58) Field of Classification Search
CPC ......... H04L 47/39; H04L 12/18; H04L 45/00; H04L 12/1886; H04L 47/20; H04L 45/74;
(Continued)

(56) References Cited

U.S. PATENT DOCUMENTS 5,561,637 A * 10/1996 Dan .................. H04N 7/17336
                                                    365/49.1
7,453,878 B1 * 11/2008 Martin .................... H04L 47/34
                                                    370/231
(Continued)

OTHER PUBLICATIONS

Li, Y., et al., "Accelerating distributed reinforcement learning with in-switch computing," 2019.
(Continued)

*Primary Examiner* — Rownak Islam
(74) *Attorney, Agent, or Firm* — Leydig, Voit & Mayer, Ltd.

(57) ABSTRACT

A network device configured to perform scalable, in-network computations is described. The network device is configured to process pull requests and/or push requests from a plurality of endpoints connected to the network. A collective communication primitive from a particular endpoint can be received at a network device. The collective communication primitive is associated with a multicast region of a shared global address space and is mapped to a plurality of participating endpoints. The network device is configured to perform an in-network computation based on information received from the participating endpoints before forwarding a response to the collective communication primitive back to one or more of the participating endpoints. An injection policy comprising the issuing of credits enables each endpoint to limit the amount of collective communication primitives injected into the network simultaneously to reduce network congestion caused by increased network traffic due to the multicast capability of the network devices.

19 Claims, 24 Drawing Sheets

(51) Int. Cl.
*H04L 47/10* (2022.01)
*H04L 47/20* (2022.01)
*H04L 47/80* (2022.01)
*H04L 45/74* (2022.01)
*H04L 67/55* (2022.01)
*H04L 67/568* (2022.01)

(52) U.S. Cl.
CPC .............. *H04L 45/74* (2013.01); *H04L 47/20* (2013.01); *H04L 47/39* (2013.01); *H04L 47/806* (2013.01); *H04L 67/55* (2022.05); *H04L 67/568* (2022.05)

(58) Field of Classification Search
CPC ... H04L 47/806; H04L 67/26; H04L 67/2842; H04L 67/55; H04L 67/586; G06F 9/5083
USPC ........................................................ 370/230
See application file for complete search history.

(56) References Cited

U.S. PATENT DOCUMENTS

| | | | |
|---|---|---|---|
| 7,761,569 | B2 | 7/2010 | Hopkins |
| 2007/0156815 | A1* | 7/2007 | Mate ................. H04L 29/06027 709/204 |
| 2011/0075555 | A1* | 3/2011 | Ziegler ................. H04L 49/555 370/229 |
| 2011/0110377 | A1* | 5/2011 | Alkhatib ............. H04L 61/2503 370/395.53 |
| 2011/0280241 | A1 | 11/2011 | Field |
| 2013/0047034 | A1 | 2/2013 | Salomon et al. |
| 2017/0149916 | A1 | 5/2017 | Huang |
| 2018/0007722 | A1 | 3/2018 | Francesc et al. |
| 2019/0052659 | A1* | 2/2019 | Weingarten ......... H04L 63/1416 |
| 2020/0012531 | A1 | 1/2020 | Li et al. |
| 2020/0244587 | A1* | 7/2020 | Li ......................... H04L 12/423 |

OTHER PUBLICATIONS

Sapio, A., et al., "Scaling distributed machine learning with in-network aggregation," CoRR, vol. abs/1903.06701, 2019.
Mikami, H., et al., Imagenet/resnet-50 training in 224 seconds, CoRR, vol. abs/1811.05233, 2018.
Ishii, A., et al., "NVSwitch and DGX-2," in Hot Chips, 2018.
Lepak, K., et al., "The next generation and enterprise server product architecture," in Hot Chips, 2017.
Jeaugey, S., "NCCL 2.0," in GPU Technology Conference (GTC), 2017.
Sanders, P., et al., "Two-tree algorithms for full bandwidth broadcast, reduction and scan," Parallel Computing, vol. 35, No. 12, pp. 581-594, 2009.
Thakur, R., et al., "Optimization of collective communication operations in mpich," The International Journal of High Performance Computing Applications, vol. 19, No. 1, pp. 49-66, 2005.
Scott, S., et al., "The blackwidow high-radix clos network," in Proceedings of the $33^{rd}$ Annual International Symposium on Computer Architecture, ser. ISCA '06, Washington, DC, UA: IEEE Computer Society 2006, pp. 16-28, ISBN: 0-7695-2608-X.
Jiang, N., et al., "A detailed and flexible cycle-accurate network-on-chip simulator," in 2013 IEEE International Symposium on Performance Analysis of Systems and Software (ISPASS), IEEE, 2013, pp. 86-96.
Luo, L., et al., "Parameter hub: A rack-scale parameter server for distributed deep neural network training," in Proceedings of the ACM Symposium on Cloud Computing, ser. SoCC '18, Carlsbad, CA, USA.
Liu, M., et al., "Incbricks: Toward in-network computation with an in-network cache," in Proceedings of the Twenty-Second International Conference on Architectural Support for Programming Languages and Operating Systems, ser. AS-PLOS '17, Xi'an, China, ACM, 2017, pp. 795-809.
Jin, X., et al., "Netcache: Balancing key-value stores with fast in-network caching," in Proceedings of the $26^{th}$ Symposium on Operating System Principles, ser. SOSP '17, Shanghai, China, ACM, 2017, pp. 121-136.
Sun, P., et al., "Optimizing network performance for distributed DNN training on GPU clusters: ImageNet/AlexNet training in 1.5 minutes," arXiv preprint arXiv:1902.06855, 2019.
Zhang, H., et al., "Poseidon: An efficient communication architecture for distributed deep learning on GPU clusters," in 2017 USENIX Annual Technical Conference, 2017, pp. 181-193.
Hashemi, S.H., et al., "TicTac: accelerating distributed deep learning with communicating scheduling," in Proceedings of the $2^{nd}$ SysML Conference, Palo Alto, CA, UA, 2019.
Cho, M., et al., "BlueConnect: Novel hierarchical all-reduce on multi-tired network of deep learning," In Proceedings of the $2^{nd}$ SysML Conference, Palo Alto, CA, USA, 2019.

* cited by examiner

INJECTION LIMITING AND WAVE SYNCHRONIZATION FOR SCALABLE IN-NETWORK COMPUTATION

CLAIM OF PRIORITY

This application claims the benefit of U.S. Provisional Application No. 62/881,528 titled "SCALABLE IN-NETWORK COMPUTATION FOR MASSIVELY-PARALLEL SHARED-MEMORY PROCESSORS," filed Aug. 1, 2019, the entire contents of which is incorporated herein by reference.

STATEMENT REGARDING FEDERALLY SPONSORED RESEARCH AND DEVELOPMENT

This invention was made with US Government support under Agreement H98230-16-3-0001 awarded by DoD. The US Government has certain rights in this invention.

TECHNICAL FIELD

The present disclosure relates to network devices. More specifically, the embodiments set forth below describe network devices configured to perform computations associated with multiple processors participating in a shared global memory system.

BACKGROUND

While many scientific applications rely on collective communication primitives, these primitives are also key to scalability in distributed machine learning/deep learning (ML/DL) training algorithms. For example, a training algorithm can be distributed among a plurality of graphics processing units (GPUs) or other parallel processing units configured to compute multiple results in parallel. Each GPU processes a batch of input samples on a model that is replicated across many GPUs. Once each GPU calculates the parameter updates, the parameters need to be collectively aggregated across all participating GPUs before the parameters are applied to local model parameters in a particular GPU.

A current solution can be implemented in a software library that provides implementations for the most common collective communication primitives, such as a broadcast primitive, an all-gather primitive, and reduction primitives. A reduction primitive is implemented in the software library by performing the reduction operation in a ring-scheme where each GPU sends a chunk of data to the next GPU in the ring. After one pass through the ring, each GPU holds a portion of the fully reduced result. Then, a second pass through the ring is required to distribute the reduction result so that every GPU holds the final reduction result.

However, although the bandwidth of the ring-scheme algorithm is sufficient, the latency is proportional to the number of GPUs. Furthermore, every step in the ring requires a costly synchronization mechanism in the form of a system-wide memory fence with a subsequent flag-write operation to signal data validity for the consumer. Measurements have shown that each synchronization can take multiple microseconds, especially limiting performance for small message sizes and larger scale. This limits the ability of the algorithm to scale with large ML/DL training applications because with every additional GPU added to the task, the compute load on each GPU decreases and communication latency quickly becomes a bottleneck. Thus, there is a need for addressing these issues and/or other issues associated with the prior art.

SUMMARY

A method, computer readable medium, and system are disclosed for limiting injection of collective communication primitives into a network using a credit-based policy. The collective communication primitives enable certain operation, such as reduction operations, to be offloaded into network elements (e.g., network switch, network router, etc.) rather than being performed in the corresponding endpoint attached to a network.

In some embodiments, a method is disclosed for allocating credits to a requesting entity that enables a wave of collective communication primitives to be injected into a network. The method can be implemented by a wave controller of an endpoint of the network. The method includes the steps of: receiving a credit request for one or more credits to be allocated to a requesting entity; allocating a counter configured to count a number of responses corresponding to the one or more collective communication primitives received by the endpoint; and transmitting the one or more credits to the requesting entity. The one or more credits enable one or more collective communication primitives for the wave to be injected into a network.

In some embodiments, the wave includes a plurality of collective communication primitives. Furthermore, a size of the wave is determined by an offload engine based on a number of collective communication primitives associated with an offload request and a maximum size of a wave, which can be determined based on network properties such as buffer sizes and delays.

In some embodiments, the wave controller includes a counter register that stores a plurality of counters corresponding to a plurality of waves that can be injected into the network sequentially such that the plurality of waves are distributed to endpoints of the network simultaneously. The wave controller further includes a size register that stores a plurality of size values corresponding to the plurality of counters. Each size value is compared against a count value stored in a corresponding counter to determine whether a particular wave allocated to the counter is complete.

In some embodiments, each collective communication primitive comprises a data packet that specifies an in-network operation. In one embodiment, the collective communication primitive specifies a reduction operation performed by a network entity and configured to reduce a plurality of values from two or more endpoints associated with the collective communication primitive based on a specified operator.

In some embodiments, the requesting entity is an offload engine connected to a network on chip (NoC). The endpoint further comprises one or more processing cores and a memory subsystem. The offload engine generates the one or more collective communication primitives and injects the one or more collective communication primitives into the network via the NoC.

In some embodiments, the method further includes the steps of: receiving a response to a first collective communication primitive from the network; determining a wave identifier corresponding to the response; reading a count value from the counter associated with the wave identifier; reading a size value corresponding to the counter; incrementing the count value; and comparing the incremented count value to the size value. If the incremented count value is equal to the size value, then the counter is freed, or if the incremented count value is less than the size value, then the incremented count value is stored in the counter.

In some embodiments, the requesting entity is configured to prevent injection of a second wave of one or more additional collective communication primitives into the network until at least one or more additional credits are received from the wave controller.

In some embodiments, an endpoint is configured to generate collective communication primitives for performing computations in a network. The endpoint includes: a network interface; and a wave controller connected to the network interface. The wave controller is configured to: receive a credit request for one or more credits to be allocated to a requesting entity; allocate a counter configured to count a number of responses corresponding to the one or more collective communication primitives received by the endpoint from the network via the network interface; and transmit the one or more credits to the requesting entity. The one or more credits enable one or more collective communication primitives for a wave to be injected into the network.

In some embodiments, the endpoint further includes: a network on a chip (NoC); and an offload engine connected to the NoC and configured to generate the one or more collective communication primitives for the wave and transmit the one or more collective communication primitives to the NoC. The offload engine determines whether to inject the one or more collective communication primitives into the network based on available credits, and wherein the offload engine is the requesting entity.

In some embodiments, a non-transitory computer readable media is disclosed. The computer readable media stores instruction that, when executed by a processor, cause the processor to perform a series of steps for performing the method set forth above.

In another aspect of the disclosure, a method is disclosed for operating an endpoint. The endpoint is coupled to a network that includes a plurality of endpoints and a shared address space. The method includes the steps of defining one or more multicast regions in the shared address space and administering an injection policy for the endpoint by issuing at least one credit that enables the endpoint to inject push requests and/or pull requests for addresses included in the one or more multicast regions. The credits limit an amount of collective communication primitives being simultaneously injected into the network.

DETAILED DESCRIPTION

A technique for sharing computational load with network devices is disclosed. Network devices are designed with a multicast capability that enables certain operations, such as a reduce operation, to be moved from conventional endpoints to the network device. In other words, the network device not only facilitates the reduce operation by forwarding data packets between endpoints, but intelligently filters the data packets to both reduce network traffic and offload computational processing from the processors of the endpoints.

A fabric manager is configured to manage a shared global address space. Regions of addresses in the shared global address space can be defined as multicast regions, and packets addressed to addresses in these multicast regions can be treated as primitives for implementing in-network computations. A pull mechanism is similar to a load request where one endpoint requests data from addresses in a plurality of different endpoints. A push mechanism is similar to a store request where multiple, independent endpoints write data to a single address, where the result is forwarded to a plurality of different endpoints. The requests can be coordinated among the participating endpoints and the values from multiple endpoints can be accumulated in the network device before being forwarded to the destination endpoints. These techniques can significantly speed up certain algorithms such as deep learning training algorithms by both reducing the complexity of the task and reducing network latency while increasing the effective network bandwidth.

Figure 1A:
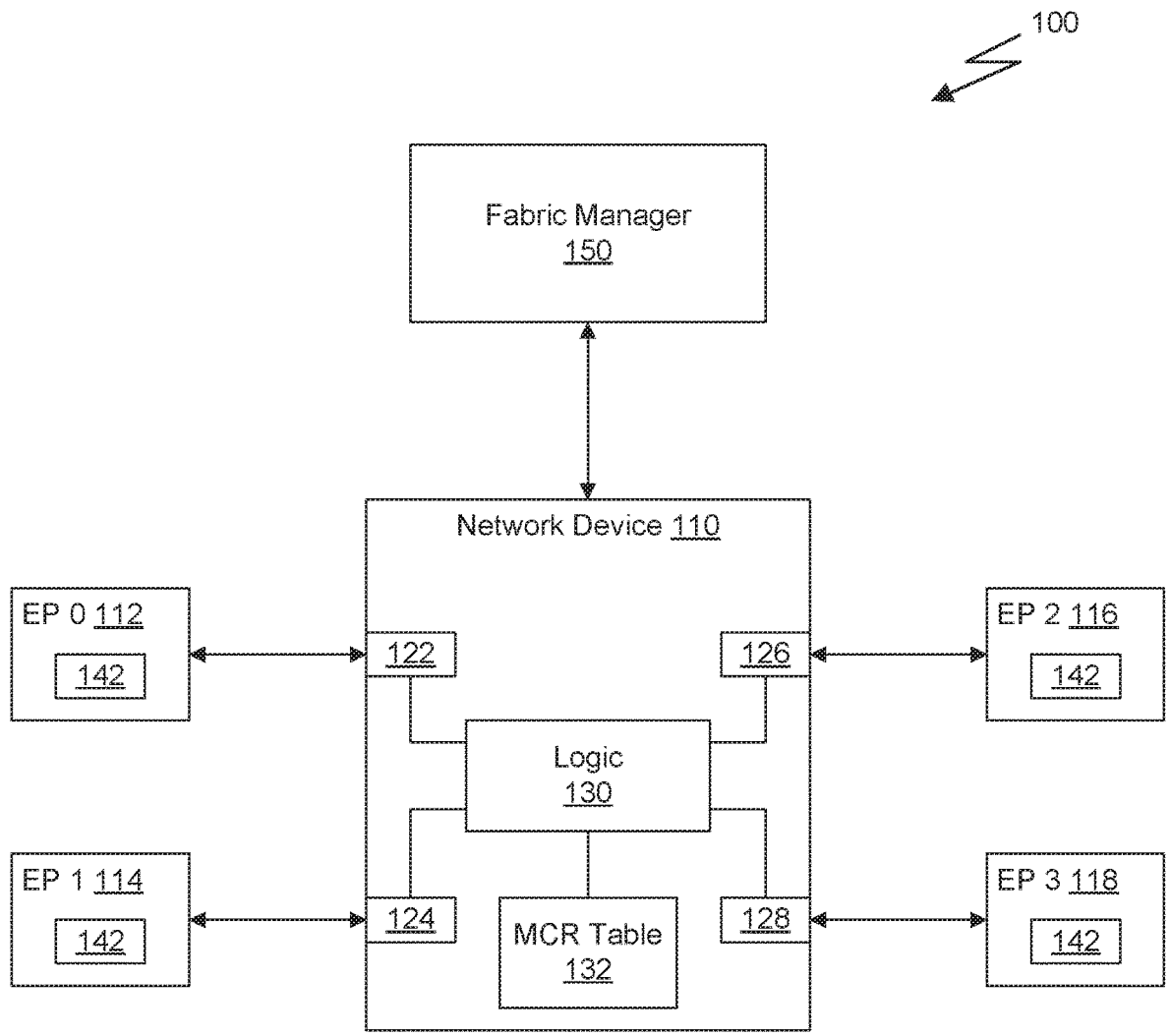
FIG. 1A illustrates a system for implementing scalable in-network computations, in accordance with some embodiments.

FIG. 1A illustrates a system for implementing scalable in-network computations, in accordance with some embodiments. As depicted in FIG. 1A, a plurality of endpoints 112, 114, 116, 118 are connected to a network device 110 in a network 100. In an embodiment, each endpoint 112, 114, 116, 118 is a computing device that includes one or more processors such as a central processing unit (CPU), a parallel processing unit (PPU), a graphics processing unit (GPU), a system-on-chip (SoC) including one or more CPU and/or GPU cores, or any other logic element capable of performing computations such as conventional arithmetic operations (ADD, SUB, MUL, etc.) and/or other programmable instructions. Each computing device may also include volatile memory, such as one or more dynamic random access memory (DRAM) modules, and/or non-volatile memory, such as a hard disk drive (HDD) or solid state drive (SSD). Each endpoint can also include a networking capability, such as a network interface controller (NIC) configured to communicate with the network device 110 via one or more communications protocols such as Ethernet.

In some embodiments, the network device 110 is a network switch. The switch includes a plurality of ports 122, 124, 126, 128 that can be connected to the endpoints 112, 114, 116, 118, respectively. The network device 110 includes logic 130 configured to perform various functions. In one embodiment, the logic 130 includes a crossbar or other programmable interface that can connect one port to another port in order to forward data packets between two or more endpoints 112, 114, 116, 118. Although only four ports are shown explicitly in FIG. 1A, the network device 110 can implement any number of ports, such as 24 or 48 ports. In other embodiments, the network device 110 can be implemented as a router instead of a switch. In yet other embodiments, the network device 110 is implemented in a network interface controller (NIC) or any processor or controller configured to process network communications.

Scalable in-network computations, such as a reduction operation, can be performed in the network 100 by offloading the computation to the logic 130 in the network device 110 (or devices) rather than performing the computations on one of the endpoints or, as described in the conventional solutions using a ring-scheme algorithm, by spreading the computation around all of the participating endpoints. In some embodiments, the logic 130 can be expanded to include arithmetic logic units (ALUs), floating point units (FPUs), or the like (if not already included) that can be configured to perform an operation on payloads included in a plurality of data packets received from a number of endpoints participating in a computation. As will be described in more detail below, the endpoints can send load or store operations to a network address that is associated with a designated multi-cast region (MCR) in an MCR table 132 maintained by the network device 110. When a data packet addressed to one of the network addresses in a MCR arrives at a port, the network device 110 is configured to allocate an entry for the operation in a table. The data packets addressed to one of the network addresses in the MCR are then processed differently than other normal data packets. In one case, the data packet is forwarded to multiple participating endpoints, and the network device accumulates responses from each of the participating endpoints before forwarding a response to one or more destination endpoints. In another case, the network device accumulates data packets from an expected number of participating endpoints before forwarding a response to one or more destination endpoints. These techniques will be discussed in more detail below.

For example, in a reduction operation, the payload of the data packet can include a value that is summed with the value in an accumulator allocated to the entry in the table. Once all data packets for the computation have been received by the network device 110, then the sum in the accumulator can be broadcast or multi-cast to each of the participating endpoints such that all of the endpoints receive the sum total of the values contained in the packets received from each participating endpoint. In some embodiments, the sum in the accumulator is unicast to a requesting endpoint rather than broadcast or multicast to all participating endpoints.

In an embodiment, the network 100 includes a fabric manager 150 that is connected to the network device 110. The fabric manager 150 is configured to setup and manage special MCRs within a global address space shared within the network 100. The logic 130 treats data packets addressed to an address outside of the MCRs as normal data packets and forwards them onto the configured port. In comparison, data packets addressed to an address within one of the MCRs can be processed in the network device 110.

The shared global address space is utilized to effectively send load and/or store requests to the network. A particular address in the shared global address space can be mapped to a single endpoint or, in the case of MCRs, to multiple endpoints. Each endpoint can include an address translation table 142 that maps the shared global address space to a local virtual address space in scope within the endpoint. Thus, different endpoints coupled to the network can implement a local virtual address space, and portions of the local virtual address space can be mapped to regions of the shared global address space utilized by the network. The endpoints can implement memory operations through processor cores such as a load store unit in a streaming multiprocessor of a parallel processing unit or through copy engines such as auxiliary direct memory access (DMA) engines configured to handle large batch memory operations. The memory access requests can be sent to the memory system, such as a memory management unit (MMU), which determines whether the memory access request is associated with a local physical memory or a network accessible memory using memory mapped input out (MMIO) in cooperation with the address translation table 142.

Figure 1B:
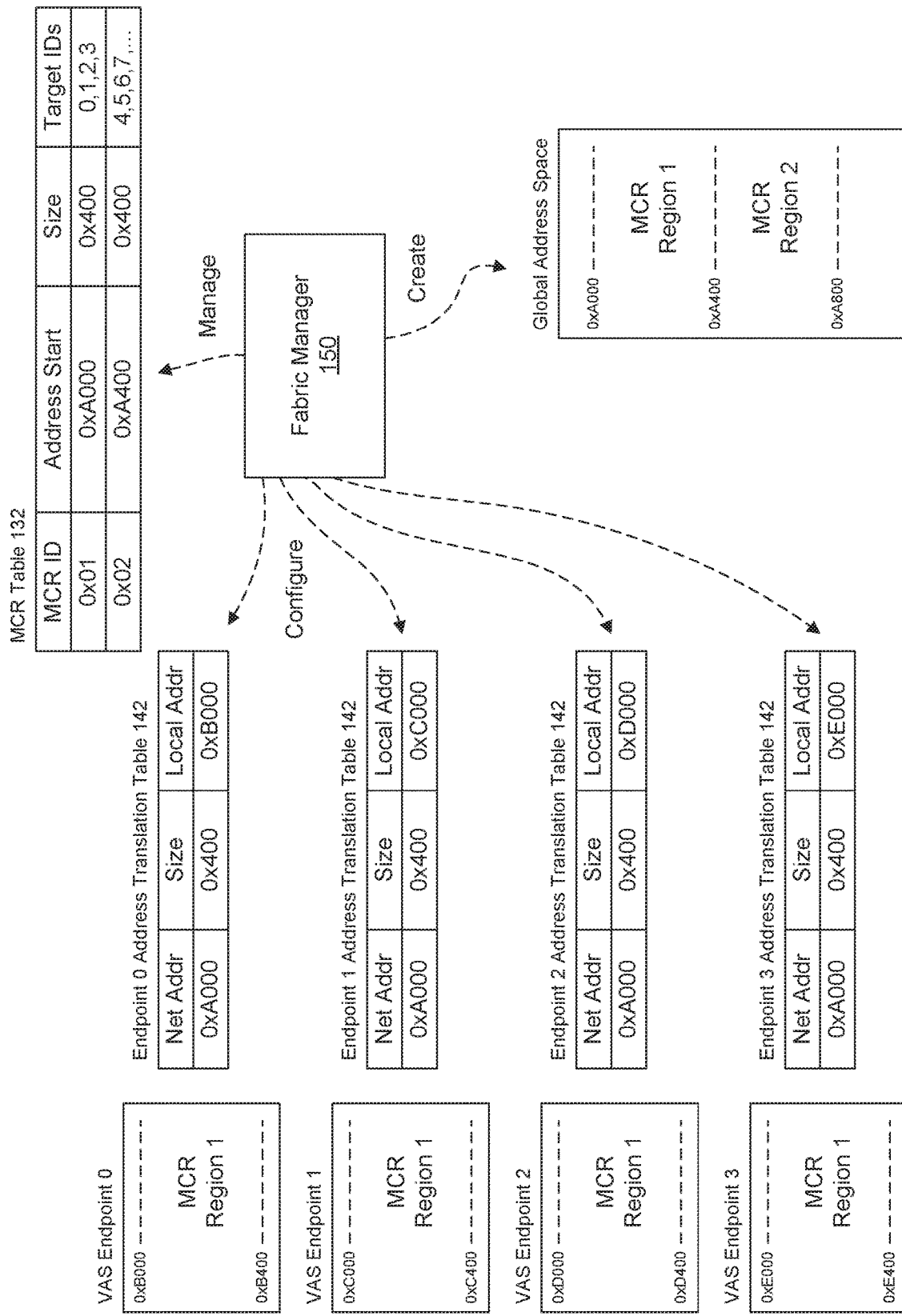
FIG. 1B illustrates the operations performed by the fabric manager of FIG. 1A, in accordance with some embodiments.

FIG. 1B illustrates the operations performed by the fabric manager 150 of FIG. 1A, in accordance with some embodiments. First, the fabric manager 150 creates special MCRs within a global address space. As depicted in FIG. 1B, a first MCR is defined between address 0xA000 and 0xA3FF having a size of 0x400 bytes. In addition, a second MCR is defined between address 0xA400 and 0xA7FF, again having a size of 0x400 bytes. Although the two MCRs are shown in adjacent address ranges in the global address space, the MCRs are not required to be adjacent in the global address space. In some embodiments, the fabric manager 150 is allocated a range of addresses within the global address space that can be used for MCRs. A host device can then request the fabric manager 150 to create an MCR for use in a particular algorithm implemented by a number of endpoints.

Once the fabric manager 150 has allocated an MCR in the global address space, the fabric manager 150 manages (e.g., updates or creates an entry) the MCR table(s) 132 in each of the network devices 110 included in the network 100. In an embodiment, the entry in the MCR table 132 can include an MCR identifier field, an MCR address start field, a size field, and a target identifier field. The MCR identifier field includes a unique identifier for each distinct MCR in the global address space. The MCR address start field includes the first address in the address range for the particular MCR corresponding to the entry. The size field includes the size of the MCR. The size field designates the number of consecutive addresses in the MCR. The target identifier field includes a list of endpoint identifiers configured to participate in a multicast computation for the MCR.

In some embodiments, the entry of the MCR table 132 can also include additional information, such as specifying a particular operation to be performed by the network device 110 on each data packet addressed to an address within the MCR. For example, the entry of the MCR table 132 can specify whether a reduction is configured to use an addition operator, a multiplication operator, a min/max operator, or a mean operator to produce a reduction result.

The fabric manager 150 also operates to configure separate address translation tables 142 for each of the participating endpoints. The global address space is a virtual address space shared by all endpoints participating in the network 100. The address translation table 142 in each endpoint maps the shared global address space to a local virtual address space in the particular endpoint. As depicted in FIG. 1B, a first endpoint (EP 0) maps the network address of 0xA000 to local address 0xB000; a second endpoint (EP 1) maps the network address of 0xA000 to local address 0xC000; a third endpoint (EP 2) maps the network address of 0xA000 to local address 0xD000; and a fourth endpoint (EP 3) maps the network address of 0xA000 to local address 0xE000. As a data packet addressed to an address in the MCR is received at an endpoint, the endpoint will translate that address to the local virtual address space and, ultimately, to a physical memory address in the local memory system. Similarly, when a data packet is generated to be sent from the endpoint to the network, the local virtual address can be translated to a network address corresponding to the shared global address space, as configured in the address translation table 142.

Although the network 100 is shown with only a single network device 110, in most embodiments, a network 100 is likely to include multiple network devices 110 as the number of endpoints grows from the tens into the hundreds or thousands. Consequently, only some ports of each network device 110 are connected directly to endpoints while other ports are connected to other network devices 110, the fabric manager 150, or left unconnected. In some embodiments, the fabric manager 150 can be implemented within one of the participating endpoints rather than as a separate device attached to the network in addition to the participating endpoints. In some embodiments, the fabric manager 150 is configured to interface with clients (e.g., software and/or firmware) included in each network device and is only indirectly connected to each network device via the network.

Figure 2:
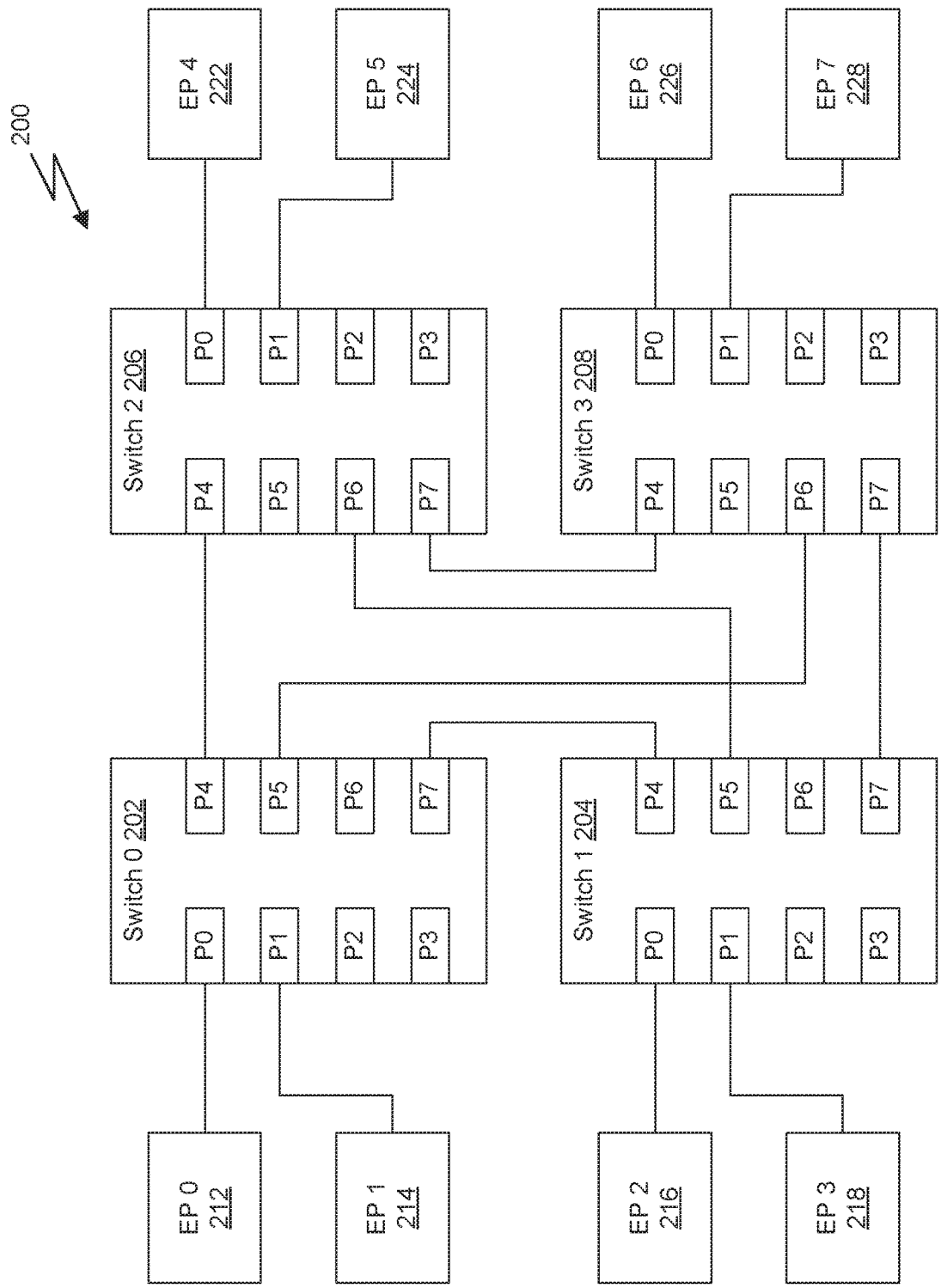
FIG. 2 illustrates a network including a plurality of endpoints connected to a plurality of network devices, in accordance with some embodiments.

FIG. 2 illustrates a network 200 including a plurality of endpoints connected to a plurality of network devices, in accordance with some embodiments. As depicted in FIG. 2, eight endpoints 212, 214, 216, 218, 222, 224, 226, 228 are connected to four network devices 202, 204, 206, 208. The network devices 202, 204, 206, 208 are referred to as switches in FIG. 2, although, in some embodiments, the network devices may incorporate optional routing functionality. A first endpoint 212 and a second endpoint 214 are connected to ports P0 and P1 of the first network device 202. A third endpoint 216 and a fourth endpoint 218 are connected to ports P0 and P1 of a second network device 204. A fifth endpoint 222 and a sixth endpoint 224 are connected to ports P0 and P1 of a third network device 206. A seventh endpoint 226 and an eighth endpoint 228 are connected to ports P0 and P1 of a fourth network device 208. Furthermore, the first network device 202 is connected from port P4 of the first network device 202 to port P4 of the third network device 206; connected from port P5 of the first network device 202 to port P6 of the fourth network device 208; and connected from port P7 of the first network device 202 to port P4 of the second network device 204. The second network device 204 is connected from port P5 of the second network device 204 to port P6 of the third network device 206; and connected from port P7 of the second network device 204 to port P7 of the fourth network device 208. The third network device 206 is also connected from port P7 of the third network device 206 to port P4 of the fourth network device 208. All connections are bi-directional.

Each of the four network devices 202, 204, 206, 208 shown in FIG. 2 can be similar to the network device 110 of FIG. 1A. More specifically, each of the network devices 202, 204, 206, 208 can include logic 130 (or equivalent) and the MCR table 132 (or equivalent). As will be described in more detail below, a scalable in-network computation can be performed in a plurality of network devices in a hierarchical manner rather than in a single network device 110 by splitting up the computation. In one embodiment, each network device only performs a subset of the computations associated with the endpoints directly connected to the ports of the network device 110. The intermediate result is then forwarded to a root port for the computation in one of the network devices, which processes the intermediate results to generate a final result for the computation.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Although the endpoints are described to include a processor and memory, in some embodiments, the endpoints can each include a parallel processing unit. The parallel processing units can execute programs that include instructions that perform operations on data in a memory. The instructions can include instructions adapted to be processed in the network by using the special MCRs. For example, a load or store instruction can be addressed to an address within a MCR, which causes the parallel processing unit in the endpoint to generate a data packet associated with the load/store instruction that is forwarded to the network device 110. A description of an exemplary parallel processing unit is set forth below before discussing the detailed methods for performing a network computation.

Parallel Processing Architecture

Figure 3:
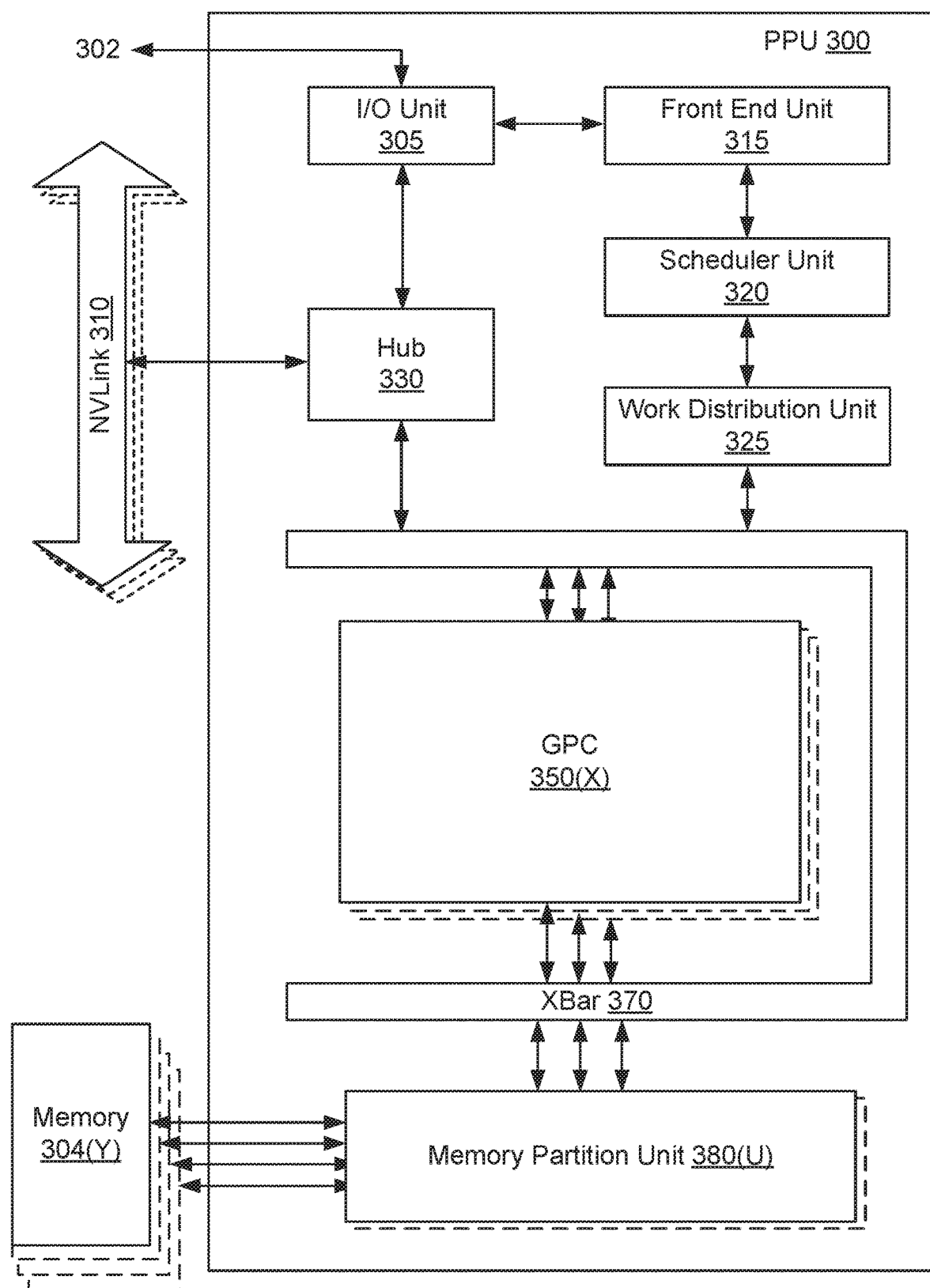
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
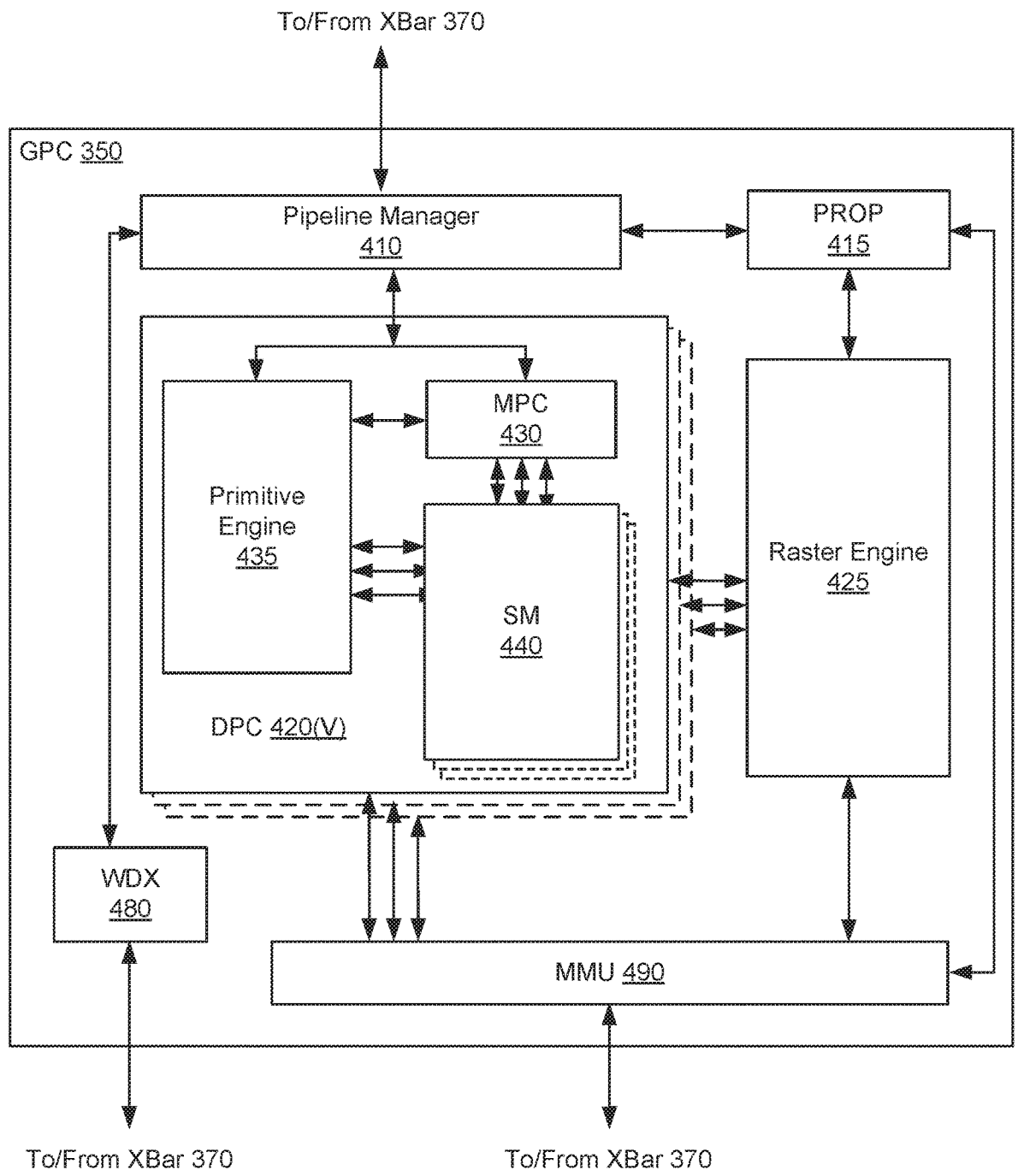
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
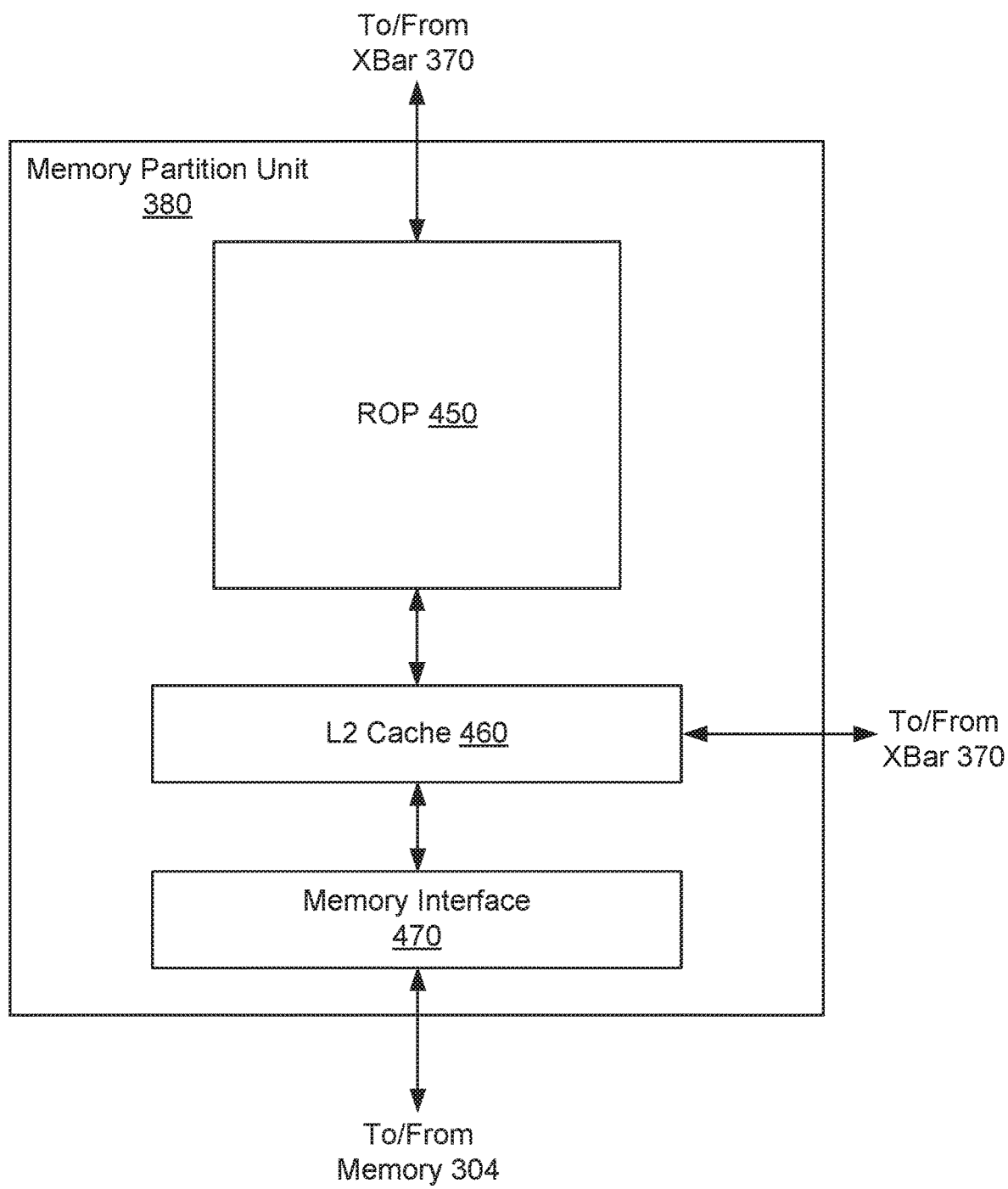
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
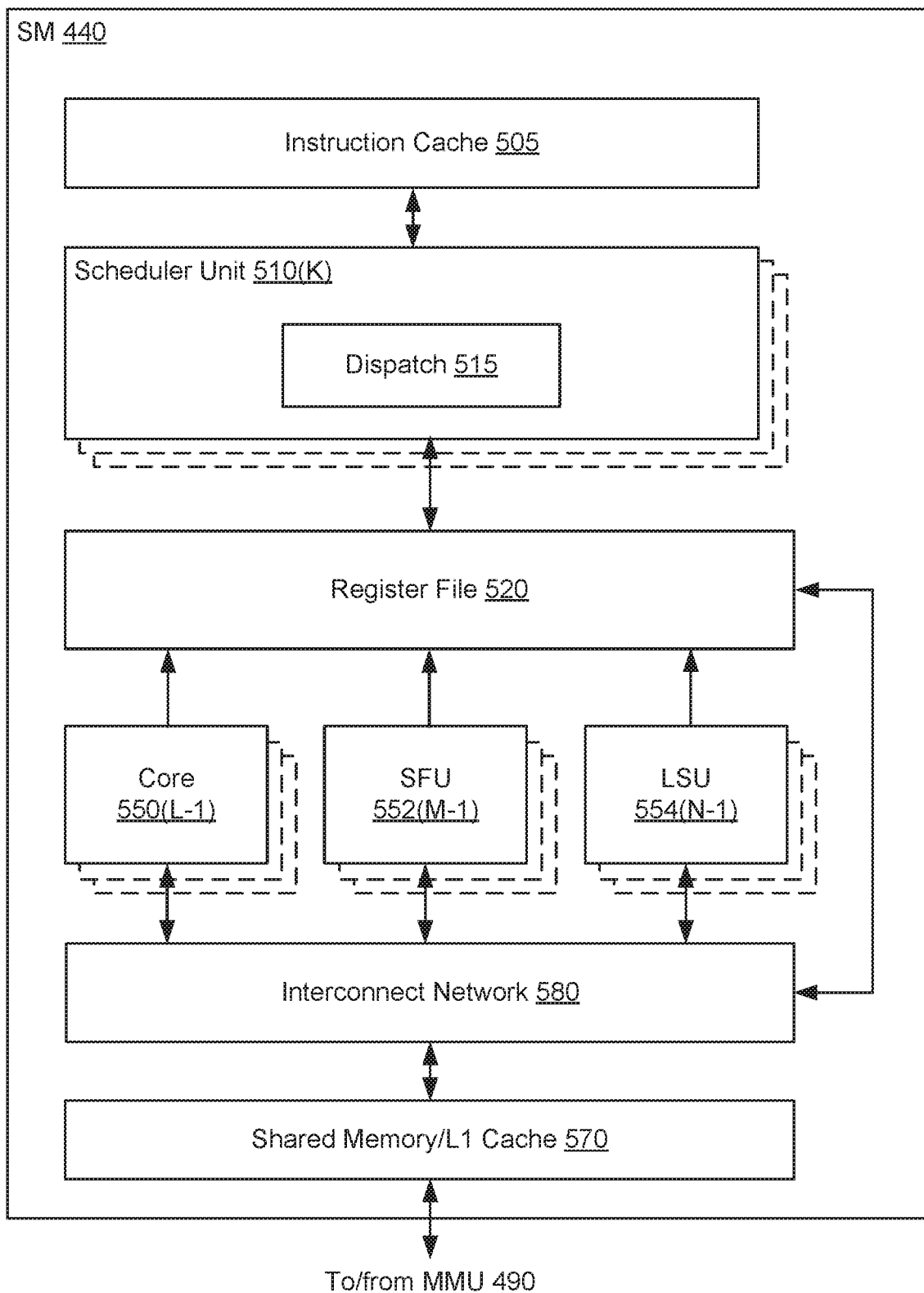
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
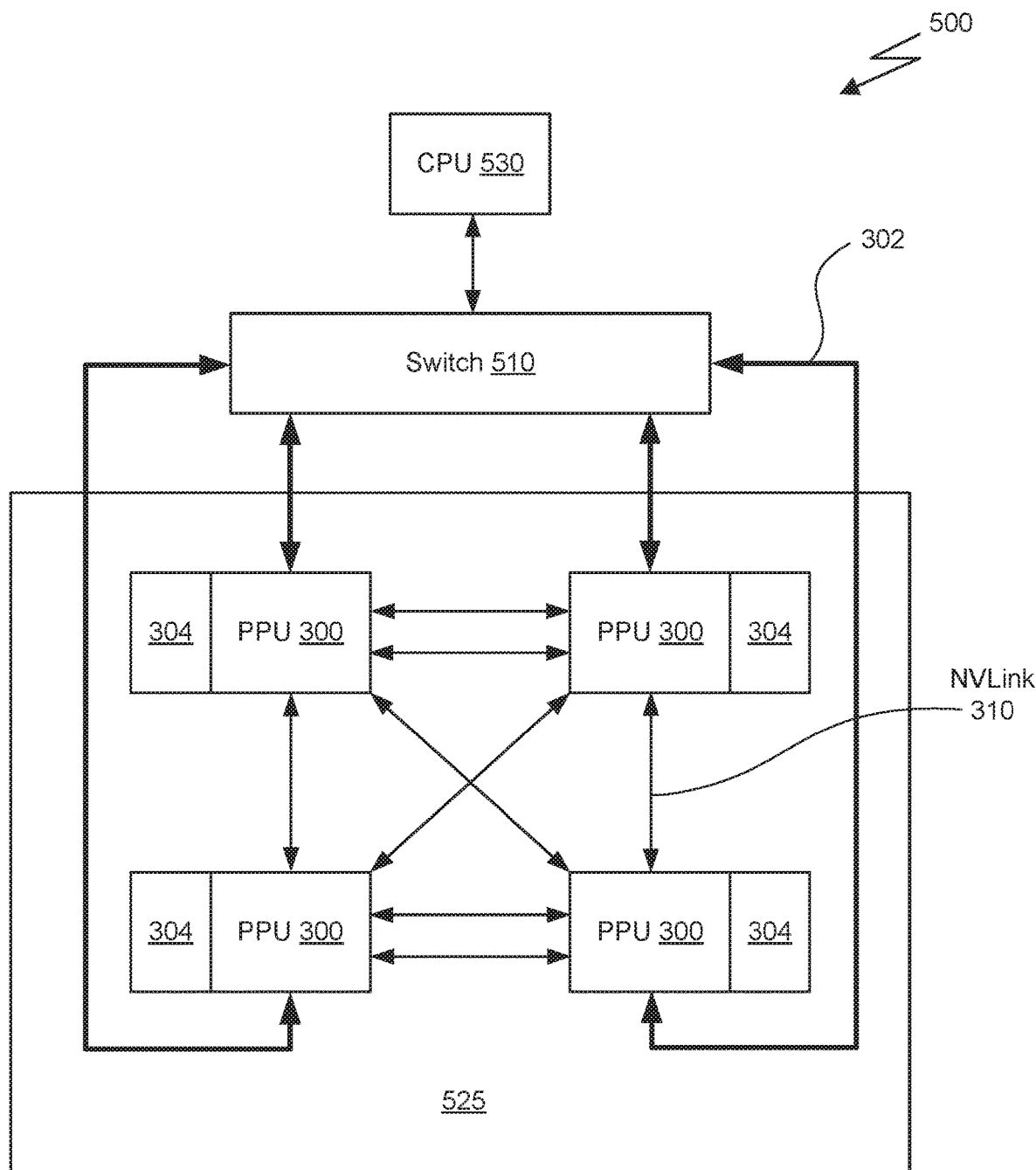
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
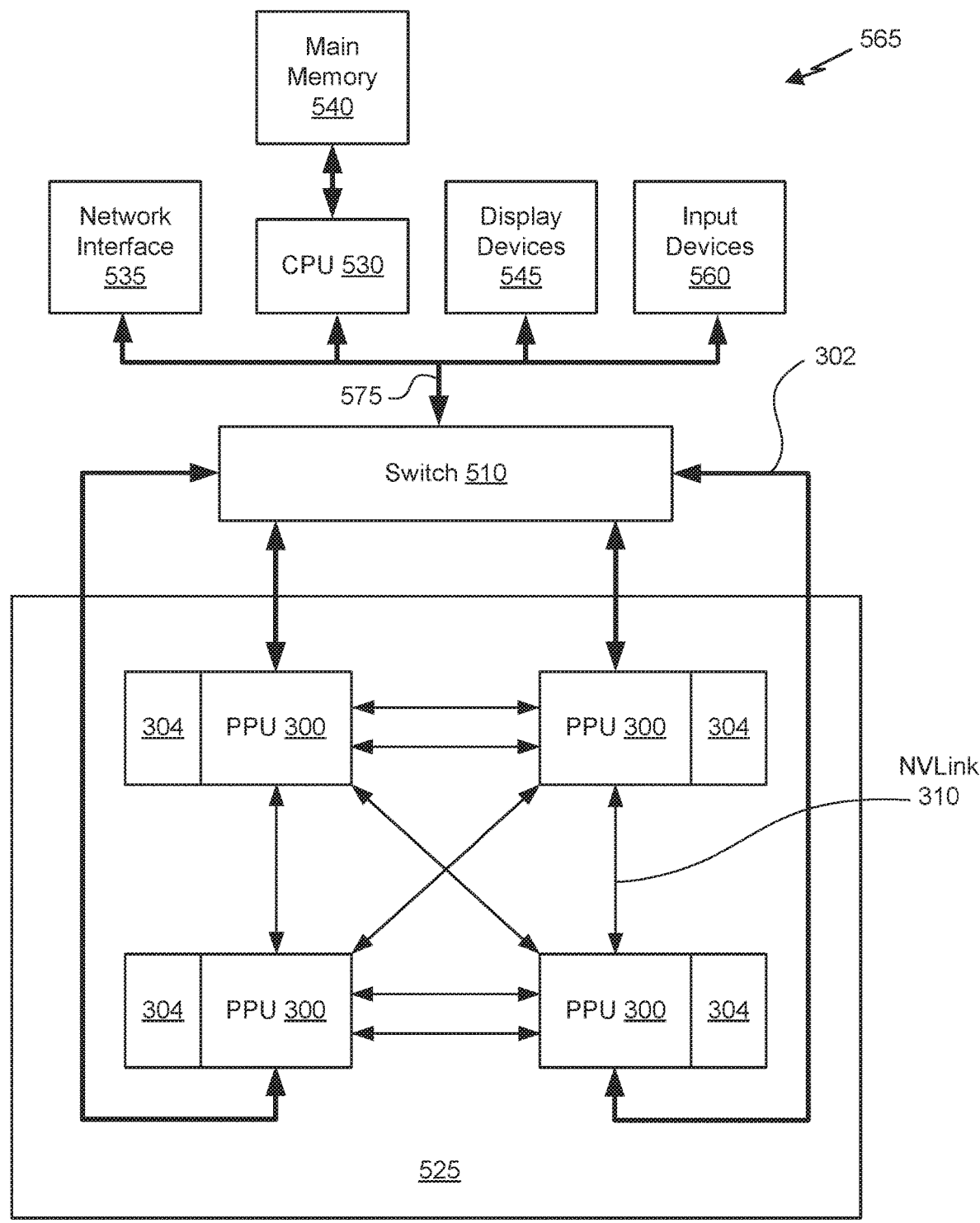
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
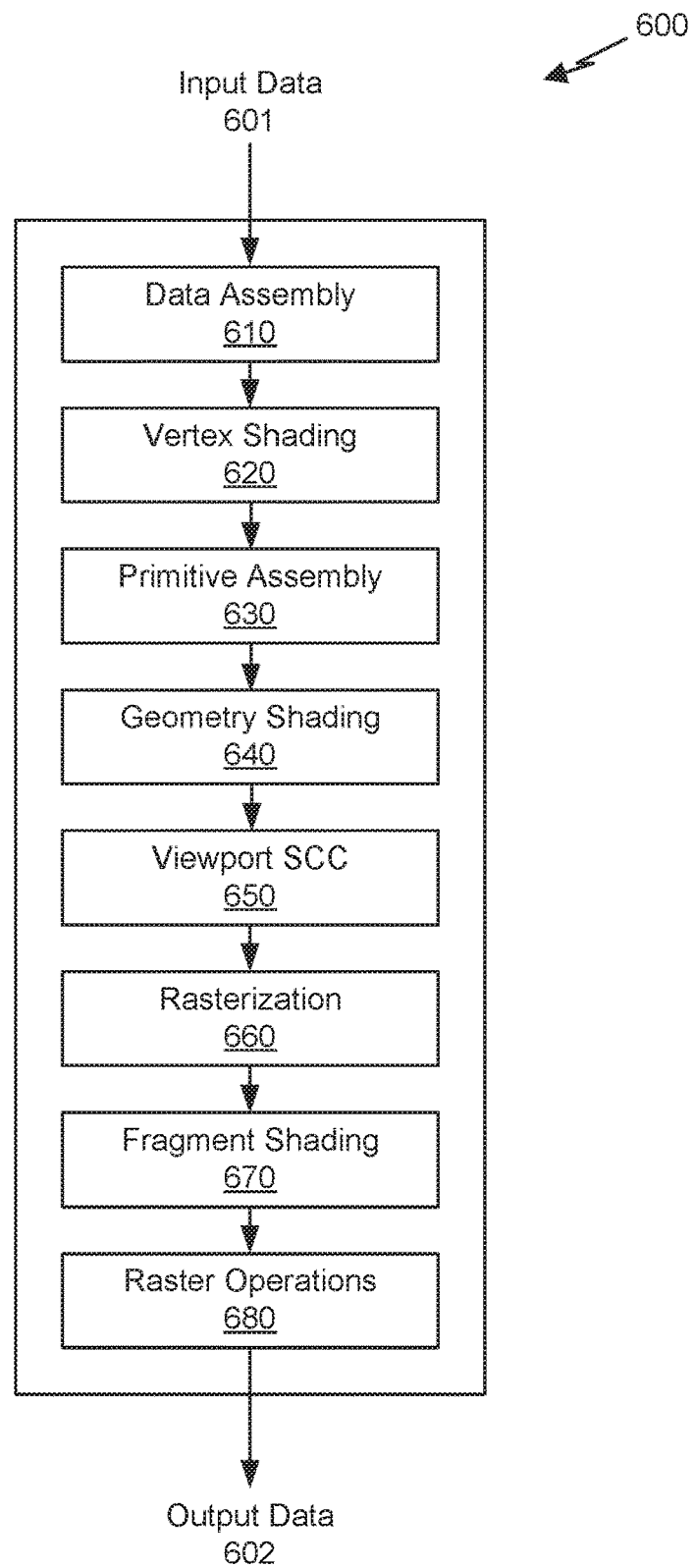
FIG. 6A is a conceptual diagram of a graphics processing pipeline implemented by the PPU of FIG. 3, in accordance with an embodiment.

FIG. 6A is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Game Streaming System

Figure 6B:
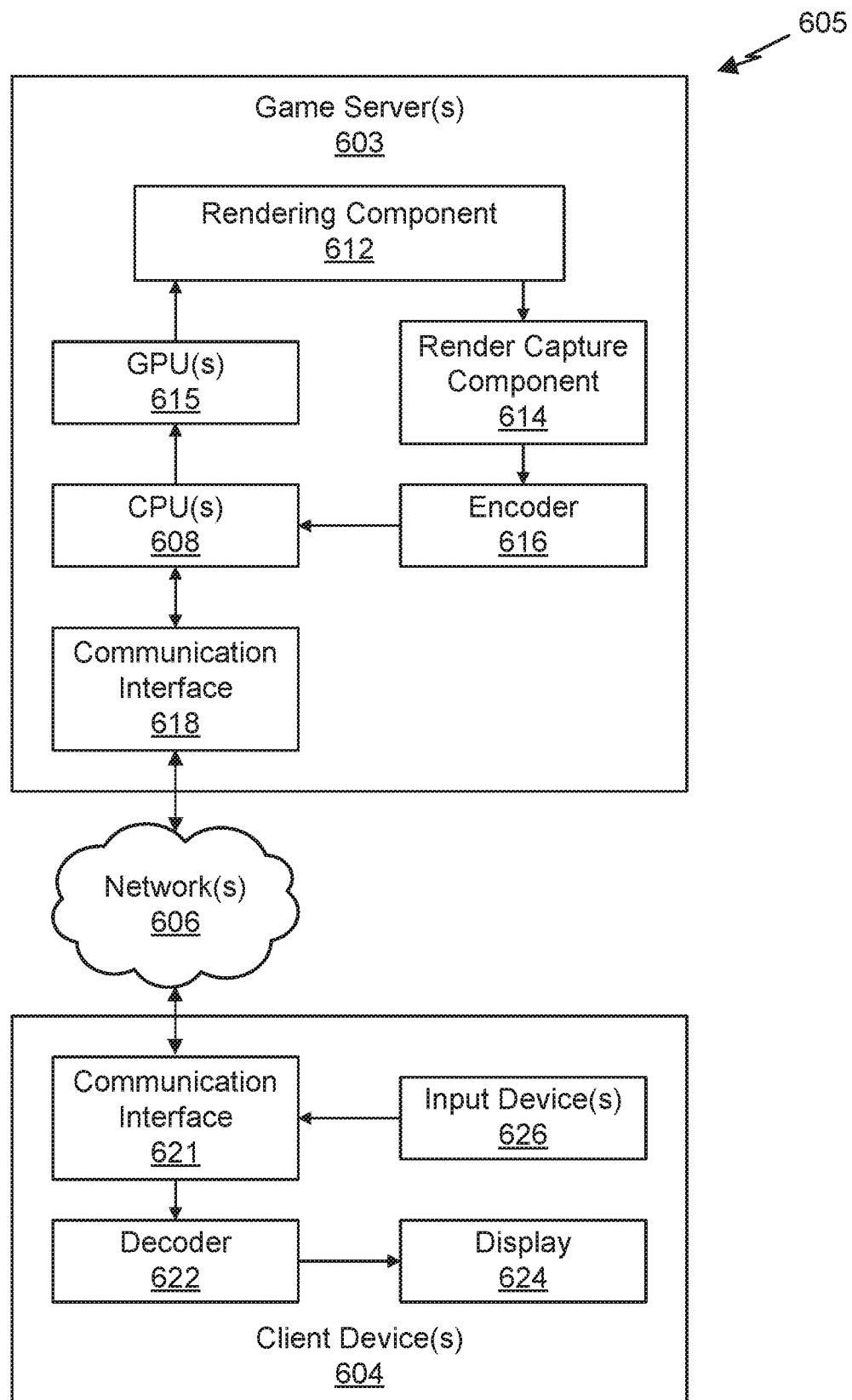
FIG. 6B is an example system diagram for a game streaming system, in accordance with some embodiments.

FIG. 6B is an example system diagram for a game streaming system 605, in accordance with some embodiments of the present disclosure. FIG. 6B includes game server(s) 603 (which may include similar components, features, and/or functionality to the example processing system 500 of FIG. 5B and/or exemplary system 565 of FIG. 5C), client device(s) 604 (which may include similar components, features, and/or functionality to the example processing system 500 of FIG. 5B and/or exemplary system 565 of FIG. 5C), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the game server(s) 603, receive encoded display data from the game server(s) 603, and display the display data on the display 624. As such, the more computationally intense computing and processing is offloaded to the game server(s) 603 (e.g., rendering—in particular ray or path tracing—for graphical output of the game session is executed by the GPU(s) of the game server(s) 603). In other words, the game session is streamed to the client device(s) 604 from the game server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the game server(s) 603. The client device 604 may receive an input to one of the input device(s) and generate input data in response. The client device 604 may transmit the input data to the game server(s) 603 via the communication interface 621 and over the network(s) 606 (e.g., the Internet), and the game server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the game server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

Scalable In-Network Computations

Whether the application calls for training a DNN or simply crunching numbers in Big Data analysis, distributed computing has changed the landscape of how data is processed. Conventionally, the processing is performed at the endpoints in the network, whether those endpoints are simple virtual machines with virtual compute resources associated with a CPU or complete servers or workstations including one or more PPUs. However, as the number of endpoints increases, performance scalability becomes increasingly dependent on communication latency. Specialized hardware such as GPUs, FPGAs, or Tensor Processing Units (TPUs) can be used to accelerate compute tasks by exploiting parallelism, and certain communications patterns could benefit from such specialization as well. A common pattern in communication is collective patterns, which involve a plurality of computing resources.

Although many collective patterns are only concerned with data distribution (e.g., transmitting data from one endpoint to another endpoint), some collective patterns such as Reduce or All-Reduce operations also involve computations. In the Reduce operation, participating endpoints send data to one endpoint that is configured to reduce the data via an arithmetic or relational operation. In the case of the All-Reduce operation, the result of the reduction operation is also broadcast to each participating endpoint. In particular, the All-Reduce operation is especially critical in parallel deep-learning training algorithms on large distributed systems. For example, after each endpoint adjusts the parameters of a neural network based on a loss function applied to results from a batch of training samples, the parameters are shared with all other endpoints associated with different batches of training samples. This can be implemented as an All-Reduce operation that is called during every training iteration. During the course of many training iterations, this All-Reduce operation can quickly become a bottleneck.

It will be appreciated that off-loading computations into the network can be an effective tool to reduce the bottleneck in these collective patterns. However, existing work tends to focus on CPU-initiated communication models where the CPU directs tasks to various accelerators located on the network. In a highly-parallelized environment, this host-processor model adds overhead that diminishes performance gains by transferring work to available network resources. In contrast, an accelerator-initiated communications model utilizing a shared memory system can help to reduce this overhead and improve the scalability of the distributed system. The payloads of such systems can be delivered in network packets that represent memory operations in the shared memory system.

This model can be adapted to utilize two different in-network communication mechanisms: a pull mechanism and a push mechanism. These mechanisms will be described in more detail below. Furthermore, direct memory access (DMA) engines in each accelerator can be leveraged to efficiently use the in-network compute capabilities at high resource utilization, performance, and better Quality-of-Service (QoS). In some embodiments, the network includes a plurality of massively parallel accelerators such as PPU 300. It will be appreciated that such networks operate on the basis of load/store operations executed by millions of threads executing in parallel on a large number of PPUs using the shared address space. The order that the threads execute can be arbitrary and non-deterministic and, therefore, protocols that would rely on a certain injection order will not typically function. However, the embodiments described herein are not limited to parallel accelerators and can be implemented using multi-core SoCs or multi-threaded processors as well.

As used herein, a collective communication primitive comprises a message (e.g., a data packet) associated with a network address. In an embodiment, a first collective communication primitive is a Broadcast primitive. The Broadcast primitive enables one endpoint to transmit data (e.g., a payload) to every other endpoint participating in the network. In an embodiment, a second collective communication primitive is a Multicast primitive. The Multicast primitive is narrower than a Broadcast primitive in that the Multicast primitive enables one endpoint to transmit data to a subset of endpoints participating in the network. In an embodiment, a third collective communication primitive is a Gather primitive. The Gather primitive enables one endpoint to collect data from a plurality of endpoints participating in the network. For example, if each of p endpoints stores m data elements locally, then the Gather primitive can be issued by a root endpoint to collect p·m data elements. In an embodiment, a fourth collective communication primitive is an All-Gather primitive. The All-Gather primitive is similar to the Gather primitive except the root endpoint broadcasts the p·m data elements to all participating endpoints so that each endpoint stores a local copy of the data. In an embodiment, a fifth collective communication primitive is a Scatter primitive. The Scatter primitive distributes a different portion of a set of data elements to each endpoint. For example, if the set of data elements contains p·m data elements, then each endpoint of p endpoints receives m data elements of the set. In an embodiment, a sixth collective communication primitive is an All-to-All primitive. The All-to-All primitive is similar to the Scatter primitive, except that each participating endpoint is the root of an associated Scatter primitive. For example, if a square matrix with p rows is divided such that each of m endpoints stores a row of the matrix, then the All-to-All primitive causes each endpoint to receive one element of each row such that the matrix is transposed and each endpoint stores a column of the matrix. In an embodiment, a seventh collective communication primitive is a Reduce primitive. The Reduce primitive is essentially the opposite of a Multicast primitive in that each of p endpoints sends m data elements to a root endpoint. Upon receiving all p·m data elements, the root endpoint performs a reduction operation to calculate m data elements. The most common operator implemented within the reduction operation is the addition operator, although a subtraction operator, a multiplication operator, a minimum operator, a maximum operator, or a mean operator are all within the scope of the Reduce primitive. In an embodiment, an eighth collective communication primitive is an Reduce-Scatter primitive. The Reduce-Scatter primitive combines a reduction operation with a scatter operation such that each of the p endpoints stores m/p data elements. In an embodiment, a ninth collective communication primitive is an All-Reduce primitive. The All-Reduce primitive extends a reduce operation with a broadcast operation to distribute the m data elements to each of the p endpoints. Finally, in an embodiment, a tenth collective communication primitive is a Barrier primitive. The Barrier primitive is a synchronization mechanism that causes an endpoint to wait until all participating endpoints have reached the same point within a thread. The Barrier primitive can be viewed as similar to a Broadcast primitive with no payload.

The description of the following embodiments will focus on the reduction primitives (e.g., Reduce, Reduce-Scatter, All-Reduce) in order to illustrate the pull mechanism and the push mechanism. The other primitives may be enhanced via the multicast capabilities of the network device. However, it will be appreciated that the mechanisms described herein will work equally well with other collective communication primitives and that the embodiments described below are not limited to a particular collective communication primitive. For example, other types of primitives can be defined that are associated with one or more computations that can be performed in a network device.

In-Network Multicast for Collective
Communication Primitives

Figure 7:
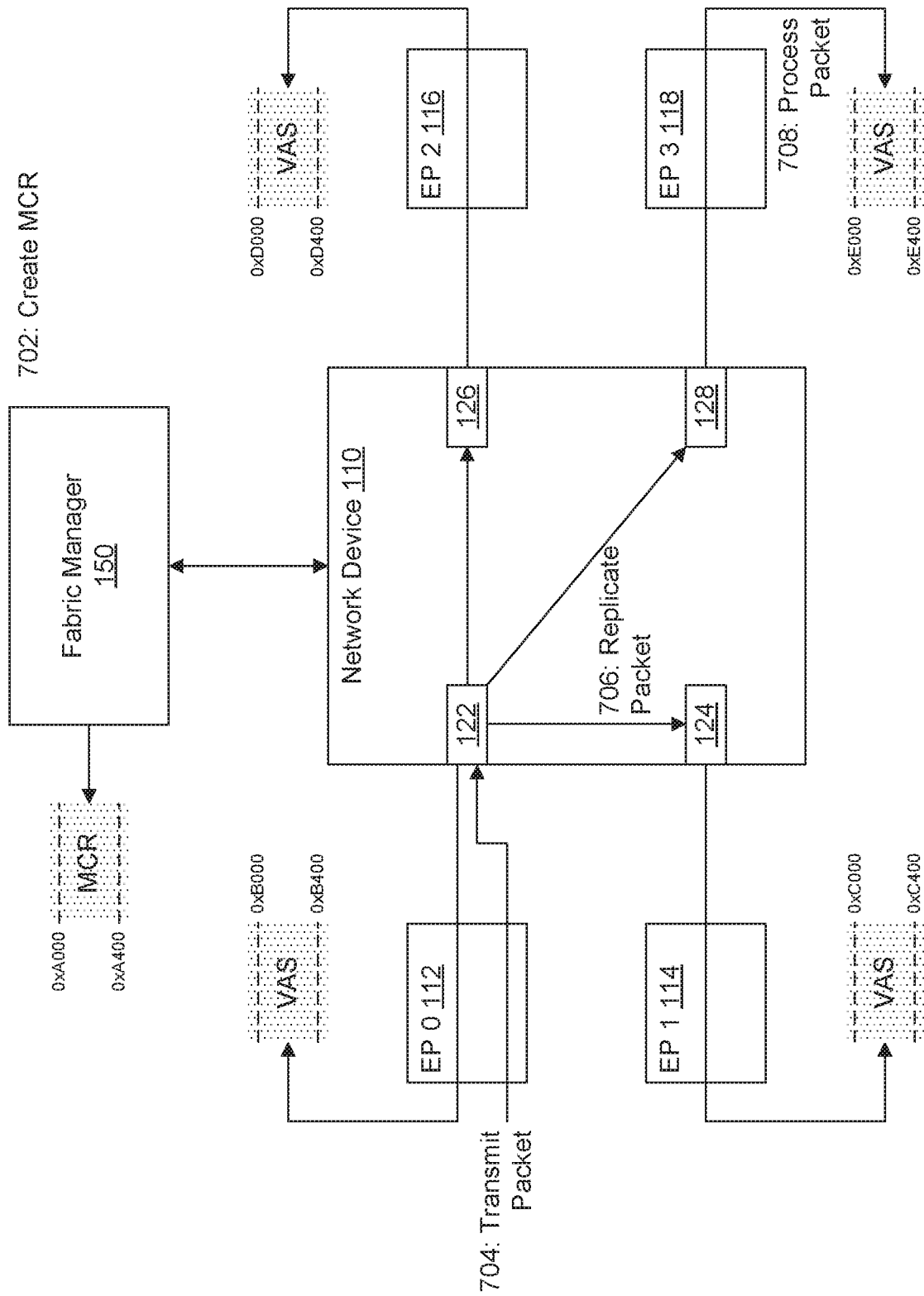
FIG. 7 illustrates a multicast capability of a network device, in accordance with some embodiments.

FIG. 7 illustrates a multicast capability of a network device, in accordance with some embodiments. In-network reductions and other collective communication primitives rely on a multicast capability of the network to implement the functionality described herein. The multicast capability requires specific hardware and/or software capabilities to be built-in to the network devices that connect various endpoints. If the network device 110 is implemented with these capabilities, then certain collective communication primitives such as the All-Reduce primitive can be implemented by transmitting packets to a network address associated with an MCR.

At step 702, the fabric manager 150 is configured to create an MCR. As part of step 702, each endpoint registers an existing memory allocation with the fabric manager 150. The memory allocation refers to a range of addresses allocated within a virtual address space (VAS) local to the endpoint. The fabric manager 150 maps the memory allocation for that endpoint to a particular MCR allocated within a shared memory space and maps a network identifier for that endpoint to the particular MCR. In some embodiments, the mapping can be implemented through memory mapped I/O (MMIO). In other words, a range of network addresses can be allocated to the fabric manager 150 and requests to map a memory allocation in the endpoint to a particular MCR can be made by a write request to one of the network addresses allocated to the fabric manager 150. In some embodiments, an application can invoke a driver to request a memory region be allocated as an MCR. The driver is a component associated with the fabric manager 150 and enables an application to call the fabric manager 150 to create the MCR in the shared network address space.

It will be appreciated that, although not shown explicitly in FIG. 7, step 702 can include updating the MCR table 132 in the network device 110 as well as updating address translation tables in each of the endpoints to map the local memory allocation to the range of addresses in the global shared address space for the allocated to the MCR by the fabric manager 150.

At step 704, an endpoint, such as endpoint 0 112, transmits a data packet to the network device 110 that represents a multicast primitive. In some embodiments, the data packet includes a header and a payload. The header can include a field for a destination address that specifies a network address included within the range of addresses allocated to the MCR. The network device 110 includes logic 130 that decodes the header of the packet and determines that the destination address is associated with a network address corresponding to the MCR. Responsive to determining the network address corresponds with the MCR, the logic 130 looks up an entry in the MCR table 132 corresponding to the MCR in order to identify the participating endpoints in the network. The participating endpoints can be identified by a list of endpoint identifiers included in a target ID field of the MCR table 132 entry.

At step 706, the logic 130 of the network device 110 is configured to replicate the packet by generating a copy of the packet transmitted to each participating endpoint. In some embodiments, generating a copy of the packet comprises generating a new packet at each of one or more ports of the network device 110 associated with one or more of the participating endpoints. In some embodiments, such as network topologies as described in FIG. 2, a hierarchical network topology is implemented such that two or more of the participating endpoints are associated with a particular port of the network device 110. In such cases, the logic 130 generates one replicated packet that is transmitted to a second, intermediate network device 110 connected to that port. The intermediate network device 110 can then repeat steps 704 and 706 to replicate the packet for other ports of the intermediate network device 110.

In some embodiments, virtual channels (VCs) are implemented by the network. Multiple VCs can share the same physical channel and VCs can be used to separate different flows of data packets in order to, for example, prioritize different flows to ensure a certain QoS in some flows. Multicast packets can utilize the same VC as unicast packets. In some embodiments, the logic 130 of the network device 110 is configured to ensure that some replicated packets are allowed to be sent via one or more ports even if other ports are not available (e.g., because those other ports may be utilized by other VC traffic). An allocation algorithm implemented by the logic 130 can ensure progress of the in-network computation and avoid deadlocks while also improving performance and maximizing crossbar utilization of the network switch capability.

At step 708, the replicated packets arrive at each participating endpoint and are processed by the endpoint. Processing a packet can refer to decoding a payload of the packet and performing any operations specified by the payload. In some embodiments, the payload for the packet can include an operation code (opcode) and data for the operation. The opcode can indicate the type of collective communication primitive contained in the packet. The data can include zero or more data elements to be processed by the endpoint. For example, if the collective communication primitive is an All-Reduce primitive, then the payload will contain a result of the reduce operation, computed in-network, that is broadcast to each participating endpoint. The endpoint can then write the data contained within the payload into a memory corresponding to the local virtual address space, as mapped from the network address for the packet in the address translation table.

It will be appreciated that since the multicast operation is supported through the native VAS of each endpoint, an endpoint can trigger a Multicast primitive through a DMA engine simply by executing a load/store operation using a particular address in the VAS mapped to the MCR. The replication of the packet to all participating endpoints is then handled by the network device 110 through the mechanisms enabled by the fabric manager 150. Embedding the multicast information in the destination address of the packets enables the packet overhead to remain small because each packet does not need to carry all information about the participating endpoints for the multicast operation. Instead, the fabric manager 150 configures all of this information by managing the various tables in the one or more network devices 110 and a potentially large number of endpoints can participate in a MCR by simply executing load/store operations for a single network address mapped to the MCR.

Pull Mechanism

While implementing multicast capabilities can be utilized by existing software algorithms, there is an opportunity to further accelerate collective communication primitives by migrating the computation overhead into the network device 110. Conventionally, an all-reduce operation can be performed by having each endpoint transmit their data elements to other endpoints to perform intermediate reduction operations. The results of the intermediate reduction operations are then shared among the participating endpoints so that each endpoint contains the full reduction result. It will be appreciated that the number of participating endpoints can quickly make these solutions inefficient as the amount of network traffic can quickly balloon such that network communication among endpoints becomes a bottleneck. Instead, the logic 130 implemented by the network device 110 can be configured to perform simple computations such that overall network traffic is reduced. For example, each of the participating endpoints can transmit an All-Reduce primitive to a network address associated with the MCR. The logic 130 processes the All-Reduce primitives and computes a reduction operation on the payloads from each of the participating endpoints. The final result of the reduction operation is then broadcast to each of the participating endpoints. In other words, the network device 110 is configured to intercept and consolidate certain network packets associated with different MCRs in order to perform operations associated with different collective communication primitives in the network device 110 rather than on the participating endpoints. The result is only forwarded to the participating endpoints once the operation is complete.

Figure 8:
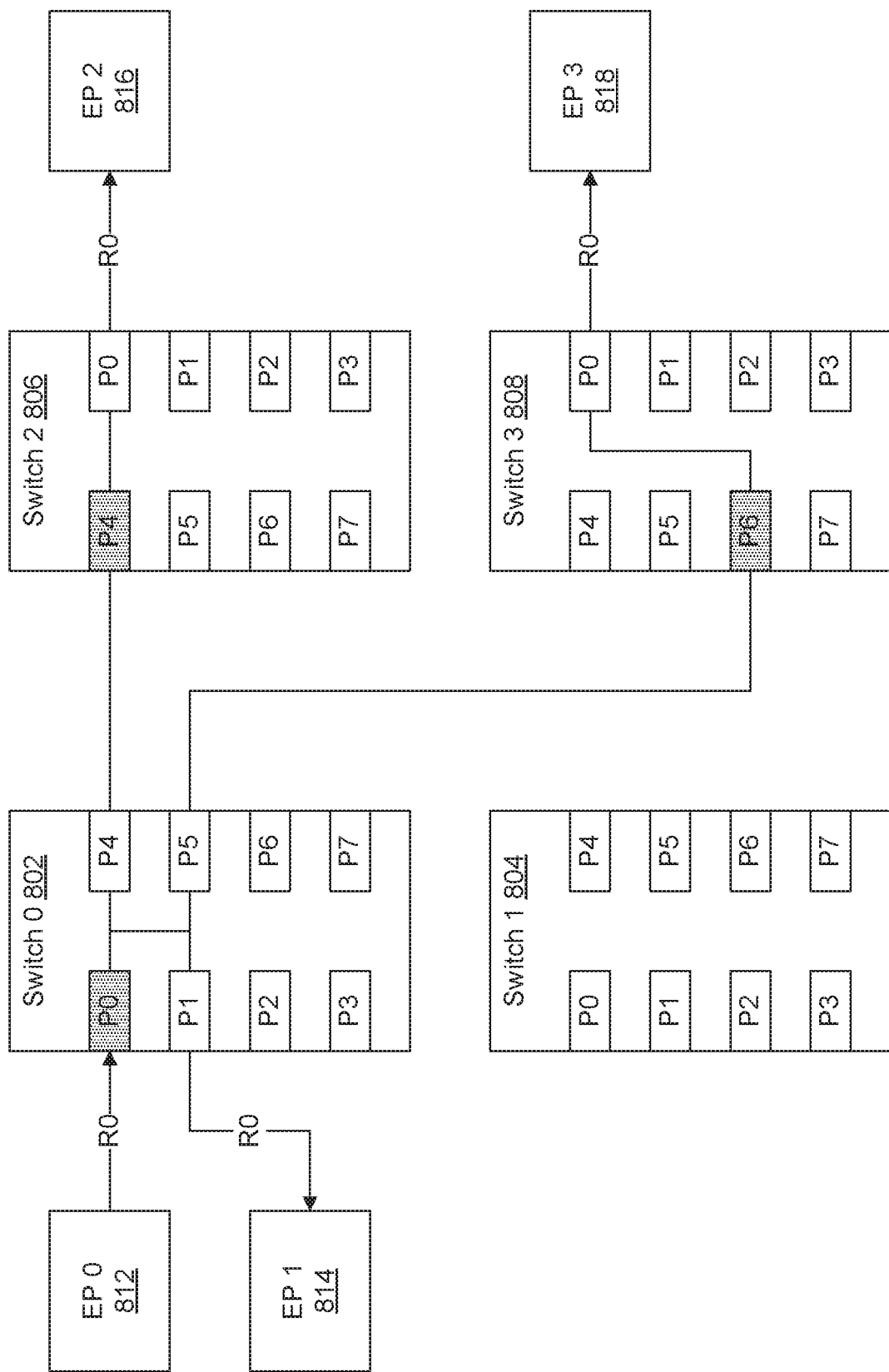
FIG. 8 illustrates a pull mechanism for in-network computations, in accordance with some embodiments.

FIG. 8 illustrates a pull mechanism for in-network computations, in accordance with some embodiments. As depicted in FIG. 8, four endpoints are participating in an MCR: EP 0 812, EP 1 814, EP 2 816, and EP 3 818. EP 0 812 and EP 1 814 are connected to ports P0 and P1 of a first network device 802, respectively. EP 2 816 is connected to port P0 of a third network device 806, and EP 3 818 is connected to port P0 of a fourth network device 808. None of the participating endpoints are connected to the second network device 804, although additional participating endpoints could be connected to available ports of any of the four network devices 802, 804, 806, 808 and/or additional network devices could be connected to the network.

In an embodiment, a pull mechanism is used to implement a collective communication primitive. A pull request refers to a load operation associated with a collective communication primitive. A load operation is essentially a request to read a memory location or range of memory addresses in the shared memory space of the network. In the case of an All-Reduce primitive associated with m data elements and p endpoints, each participating endpoint is configured to receive m/p pull requests from the network, each separate pull request is associated with a different network address in the range of network addresses associated with an MCR.

Consequently, the network devices within the network receive a total of m pull responses addressed to m/p different network addresses associated with the MCR and are configured to generate m/p different reduction results transmitted to each of the p endpoints. In other words, an endpoint transmits m/p pull requests to the network, which are multicast to the p participating endpoints, and at one or more endpoints receive m/p responses that contain the results for the computation.

In some embodiments, it is necessary to ensure that all endpoints have completed any operations that manipulate the data being reduced prior to implementing the reduction operation. Consequently, in some cases, a Barrier primitive can be generated by each thread prior to generating a different collective communication primitive, such as the All-Reduce primitive, to ensure that the pull requests do not fetch stale data.

In one embodiment, the logic 130 at each network device can include a reduction table. Upon receiving a collective communication primitive such as the All-Reduce primitive at a particular port, the logic 130 allocates an entry of the reduction table for the collective communication primitive. The logic 130 may check to see if an entry already exists in the reduction table prior to allocating the entry. The entry indicates that the network device anticipates receiving a response to the pull request from each of the participating endpoints. Once the entry is allocated, the pull request is forwarded through the network using the multicast capability described above.

For example, as depicted in FIG. 8, a first endpoint 812 generates a pull request (RO), which is transmitted to the first network device 802 (e.g., Switch 0). The first network device 802 allocates an entry in the reduction table maintained by the logic 130 for the pull request and then forwards the pull request to each of the participating endpoints based on the corresponding entry in the MCR table 132. In some embodiments, the pull request includes a payload that contains m/p data elements from the first endpoint 812 that will be included in the reduction result.

As depicted in FIG. 8, the logic 130 determines that the pull request is forwarded to the second endpoint 814 via port P1 of the first network device 802; determines that the pull request is forwarded to the third endpoint 816 via port P4 of the first network device 802; and determines that the pull request is forwarded to the fourth endpoint 818 via port P5 of the first network device 802. The logic 130 can use any technically feasible means for determining routing of the packets to the various endpoints. The pull request arrives directly at the second endpoint 814. However, the pull request for the third endpoint 816 arrives at the third network device 806 and the pull request for the fourth endpoint 818 arrives at the fourth network device 808. The third network device 806 allocates an entry in a reduction table maintained by the logic 130 of the third network device 806, and the fourth network device 808 allocates an entry in the reduction table maintained by the logic 130 of the fourth network device 808. The hierarchical topology of the network allows for each network device to collect a subset of the responses from the participating endpoints, calculate an intermediate reduction result, and transmit the intermediate reduction result to the initiating network device that first receives the pull request.

In some embodiments, each entry in the reduction table includes a field that indicates a number of responses that, once received, indicates that the reduction is complete. The entry can also include a field to store an intermediate reduction result. As responses are received from each of the participating endpoints, the payload included in the response is combined with the intermediate reduction result in the entry of the reduction table based on the particular reduction operator specified by the collective communication primitive. In some embodiments, the reduction operator can be associated with the MCR in the MCR table 132. For example, when the fabric manager 150 configures an MCR in the global shared address space, the MCR table 132 can include a field that specifies a specific reduction operator associated with any reduction-based collective communication primitives addressed to a network address within the range covered by the MCR. In such embodiments, a request from the endpoint does not need to include a designation of the reduction operator in the request. Examples of a reduction operation can include an addition operator, a multiplication operation, a min/max operator, and the like. In other embodiments, the request can specify, explicitly, a reduction operation to associate with the collective communication primitive, and the reduction operator can be stored in a field of the reduction table by the network device. In such cases, different reduction operators can be specified for two different collective communication primitives addressed to different addresses in the same MCR, or addressed to the same address if a Barrier primitive is used to confirm that one reduction is complete before another reduction is begun.

In some embodiments, payloads received at some network devices are combined by appending the payload to a list of response data in the entry of the reduction table. This may be performed when the network device does not contain the root port for an operation and is an intermediate device that collects only a portion of the responses from the participating endpoints before forwarding a partial result to the root node (or a second intermediate node) in the network path. By not performing the arithmetic operations on the payload to compute a partial reduction result before forwarding the intermediate result, the logic in the network device of the root port can perform a deterministic reduction operation by controlling the order of the arithmetic operations on all of the received payloads from all of the participating endpoints.

After receiving the request, each participating endpoint generates a response to the request. Again, a pull request is essentially a load request directed to a specific network address. Each endpoint translates the network address into a local virtual address based on the local address translation table stored by the endpoint. A physical memory location associated with the local virtual address is read from a local memory included in the endpoint, and the data element(s) read from that memory address is included in a payload of the response. Again, the response is a data packet that include a header and a payload, where the data element(s) read from the memory address are included in the payload. The header includes the network address associated with the response as well as a network address for the root endpoint (e.g., EP 0 812 in the example depicted in FIG. 8). Alternatively, in some embodiments, the header of the response can include a tag associated with the request that indicates to the network device where the response should be forwarded. Each endpoint forwards the response back to the network, directed to the root endpoint.

Again, as each response is received and decoded by a network device, the network device checks the network address included in the response to determine if the network address is associated with an MCR and, if the network address is associated by the MCR, checks the reduction table to determine if the response is associated with an entry in the reduction table. If the response is associated with the entry in the reduction table, then the logic 130 decodes the payload of the response and combines the payload with the intermediate reduction result in the reduction table. Alternatively, the payload can be stored in the reduction table until all expected payloads are received in order to enforce a strict ordering of the reduction operation. A field in the reduction table is incremented to count the number of responses that have been combined in the intermediate reduction result. If the count is less than the number of expected responses indicated in the reduction table, then the logic 130 discards the response packet and does not forward the packet through the network. However, if the count is equal to the number of expected responses indicated in the reduction table, then the logic 130 generates a new response packet that includes the intermediate reduction result and forward the new response packet on to the root endpoint through the network.

As depicted in FIG. 8, the third network device 806 would receive one response from the third endpoint 816, would combine the payload of the response with the intermediate reduction result in the reduction table, and would generate a new response that includes the resulting intermediate reduction result, which is forwarded on to the first network device 802 via port P4 of the third network device 806. Similarly, the fourth network device 808 would receive one response from the fourth endpoint 818, would combine the payload of the response with the intermediate reduction result in the reduction table, and would generate a new response that includes the resulting intermediate result, which is forwarded on to the first network device 802 via port P6 of the fourth network device 808. Those responses would arrive at the first network device 802 via ports P4 and P5, along with a separate response from the second endpoint 814 via port P1, and be combined with the intermediate reduction result in an entry of the reduction table included in the first network device 802. It will be appreciated that all three responses may arrive at the first network device 802 at different times and in indeterminate order. After all three responses have arrived at the first network device 802, a new response is generated by the logic 130 of the first network device 802 that includes the intermediate reduction result in the reduction table of the first network device 802, which is forwarded onto the first endpoint 812 via port P0. It will be appreciated that once a new response is generated by the logic 130 of a network device responsive to the counter for the number of received responses equaling a number of expected responses stored in the entry of the reduction table, the entry in the reduction table can be deleted from the reduction table so that new entries in the reduction table can be allocated to new requests received from one or more endpoints.

In some embodiments, if the collective communication primitive is an All-Reduce primitive, the logic 130 of a first network device 802 is configured to broadcast the response to each participating endpoint rather than only forwarding the response to the root endpoint (e.g., EP 0 812). The manner for determining whether a participating network device includes a port acting as a root port for the request can be implemented in a number of different ways including, but not limited to, including a flag in the header or the payload of a request. When a network device receives a request and allocates a new entry in the reduction table, a field in the entry of the reduction table can be set to indicate the entry is associated with a root port of the request. The flag in the request can then be reset (e.g., cleared) before forwarding the request onto the various participating endpoints specified in the MCR table 132. In this manner, even though a hierarchical topology of network devices may exist in the network, only one network device is configured to broadcast a complete result to all of the participating endpoints.

It will be appreciated that, in some embodiments, the fourth endpoint 818 could be connected directly to the third network device 806 rather than to the fourth network device 808. In such cases, it would be clear that the logic 130 of the third network device 806 would wait to generate a new response to forward on to the first network device 802 until both responses form the third endpoint 816 and the fourth endpoint 818 have been received by the third network device 806 and combined with the intermediate reduction result in the reduction table.

In some embodiments, the size of the reduction table is limited by manual configuration. For example, the reduction table can be limited to 32 entries, 128 entries, or the like. The number of entries in the reduction table dictates a limit on the number of independent collective communication primitives that can be in-flight in the network at any one time. Different endpoints can insert collective communication primitive requests into the network as different programs are being executed by the various endpoints connected to the network. The different requests can be directed to network addresses in the same MCR or different MCRs. It will be appreciated that a reduction table can become full and a back-pressure signal indicating whether the request can be processed by the network can be included in a response to the root endpoint. In some cases, the back-pressure is indicated using credits, where a sender requires credits to transmit a data packet to the network device. Credits are issued by the network device when there are free entries in the reduction table.

For example, in some cases, the first network device 802 may have a number of pending primitives in-flight when a new request is received from the first endpoint 812. When trying to allocate a new entry in the reduction table, an error is returned that the entry cannot be allocated. The logic 130 in the first network device 802 can be configured to generate a response to the first endpoint 812 that indicates the request failed due to the availability of the network. It will also be appreciated that, in a hierarchical topology of network devices shown in FIG. 8, an entry in the reduction table of the first network device 802 may be allocated, but a new entry of a subsequent network device may fail. In such cases, the logic 130 of the first network device 802 can evict the entry in the reduction table and generate a response to the root endpoint that the request failed, or the logic 130 of the first network device 802 can continue to process responses that do not fail and re-transmit the request to the failed network devices at a later point in time where an entry in the reduction table of those network devices can later succeed when one or more entries in the reduction table have been evicted as other collective communication primitives have completed processing within the network device.

In some embodiments, a credit-based system can ensure that there is a free entry in the reduction table for any request transmitted by an endpoint to the network device. Consequently, there is never a failure to allocate an entry in the reduction table and requests are simply stalled at the endpoint until an entry can be allocated. Such implementations may be a preferred mechanism for the pull mechanism in order to ensure that a full result is returned in response to each request and eliminate management on the backend to store and combine intermediate results at the endpoints. However, this does add some minor complexity at the front end in order to implement the credit-based system.

In some cases, a deadlock condition could arrive if certain network devices allocate entries in the reduction table for a first set of collective communication primitives and other network device allocate entries in the reduction table for a second set of collective communication primitives. It could be the case that a collective communication primitive allocated an entry in a reduction table of a first network device requires but cannot obtain an entry in a reduction table of a second network device in order to complete processing of all responses from all participating endpoints to the collective communication primitive. At the same time, another collective communication primitive allocated an entry in a reduction table of the second network device requires but cannot obtain an entry in a reduction table of the first network device in order to complete processing of all responses from all participating endpoints to the other collective communication primitive. The deadlock condition could remain if neither the first network device nor the second network device can completely collect all responses necessary to complete the computation for all participating endpoints. Thus, in cases where the logic 130 is configured to complete a portion of the processing while attempting to re-transmit the request to one or more network devices that indicated a failed attempt to process the request, in some embodiments, the logic 130 implements an eviction policy for the reduction table.

In some embodiments, an eviction policy of the reduction table evicts the oldest entry whenever a new request is received while the reduction table is full. Thus, a request will never fail outright due to a full reduction table, although certain intermediate reduction results stored in the reduction table can be evicted from the reduction table before all responses have been received at the network device. In cases of eviction before all responses are received, the logic 130 can generate a response to forward onto the network that includes the partial intermediate reduction result as well as an indication of a number of responses associated with the partial intermediate reduction result. In some embodiments, the indication can be included in a header of the response, such as a number of responses that were received and combined into the partial intermediate reduction result. In other embodiments, the indication can be included in the payload of the response along with the partial intermediate reduction result. In some embodiments, the entry of the reduction table can store endpoint identifiers for all responses that have been received from participating endpoints, and the indication in the response can comprise a list of endpoint identifiers associated with the partial intermediate reduction result. The list of endpoint identifiers can be included in the payload of the response. It will be appreciated that an eviction policy may not be necessary in credit-based systems, although an eviction policy may be necessary in cases where one or more endpoints could experience a failure that could lead to a deadlock when an endpoint fails to transmit a response to an earlier sent request.

It will be appreciated that the number of participating endpoints can be quite large and, as a result, a size of the list of endpoint identifiers can be highly variable, making such information unsuitable for the payload header. However, if a particular endpoint receives a partial intermediate reduction result, the endpoint must generate a new request to complete the reduction operation and only needs to get a response from a subset of the participating endpoints. In some embodiments, a request can include an indication that the payload includes a list of participating endpoints that overrules the list of participating endpoints in the MCR table 132. For example, a flag in the header of a request can indicate that the request is a follow-up request to complete a particular reduction operation and, therefore, the request should only be forwarded to a subset of the total number of participating endpoints in the MCR table 132 because a previous partial intermediate reduction result was obtained in response to an earlier request. In this manner, the root endpoint is responsible for managing completion of the reduction operation when a partial intermediate reduction result is obtained due to premature eviction of the entry of the reduction table in the network.

In other embodiments, a request can only fail at the root network device. In other words, each subsequent network device after the first network device that allocates an entry in a reduction table is configured not to allocate an entry in that reduction table in the subsequent network device. The logic 130 can be directed to read a flag from the header of the request to determine if an entry in the reduction table should be allocated. The flag is set in the request by the root endpoint and the first network device that receives the request allocates an entry in the reduction table and clears the flag before forwarding the request to the participating endpoints using the multicast capability. In such embodiments, all responses will be forwarded from the participating endpoints through the network, through zero or more intermediate network devices, and ultimately end up at the first network device, which then combines the payload of each response with the intermediate reduction result in the entry of the reduction table. The entire reduction operation is performed at a single network device rather than being distributed at a plurality of network devices in stages.

In some embodiments, as long as an entry in the reduction table is allocated at the root network device, the request will not fail. However, entries in the reduction tables of subsequent network devices can be allocated, if available, in order to perform a partial reduction operation at a subsequent network device in the network path of at least a portion of the participating endpoints. In this manner, opportunistic pull reduction can be performed where reduction tables are used as available to distribute the computation to more than one network device, but failure or delay of the computation will not be caused by a full reduction table in any single network device, other than the root network device. In some embodiments, opportunistic pull reduction requires some mechanism for remembering whether an earlier allocation attempt was successful, such as by adding such information in a header associated with the pull request or corresponding pull response.

It will be appreciated that the pull mechanism described above operates similar to a remote read request. In other words, the pull request is a request for each participating endpoint to read a memory location in the local memory and forward the data element read from that operation to the root endpoint. A network device is configured, through the allocation of the entry of the reduction table, to collect and combine the payloads from the plurality of requests before forwarding the result to the root endpoint or all participating endpoints, depending on the type of collective communication primitive associated with the pull request. In order to ensure that all participating endpoints have completed processing the data at the memory location before the pull request arrives at the participating endpoint, a Barrier primitive may be needed that stalls the pull request from being issued until all participating endpoints have reached a synchronization point in the program.

Figure 9:
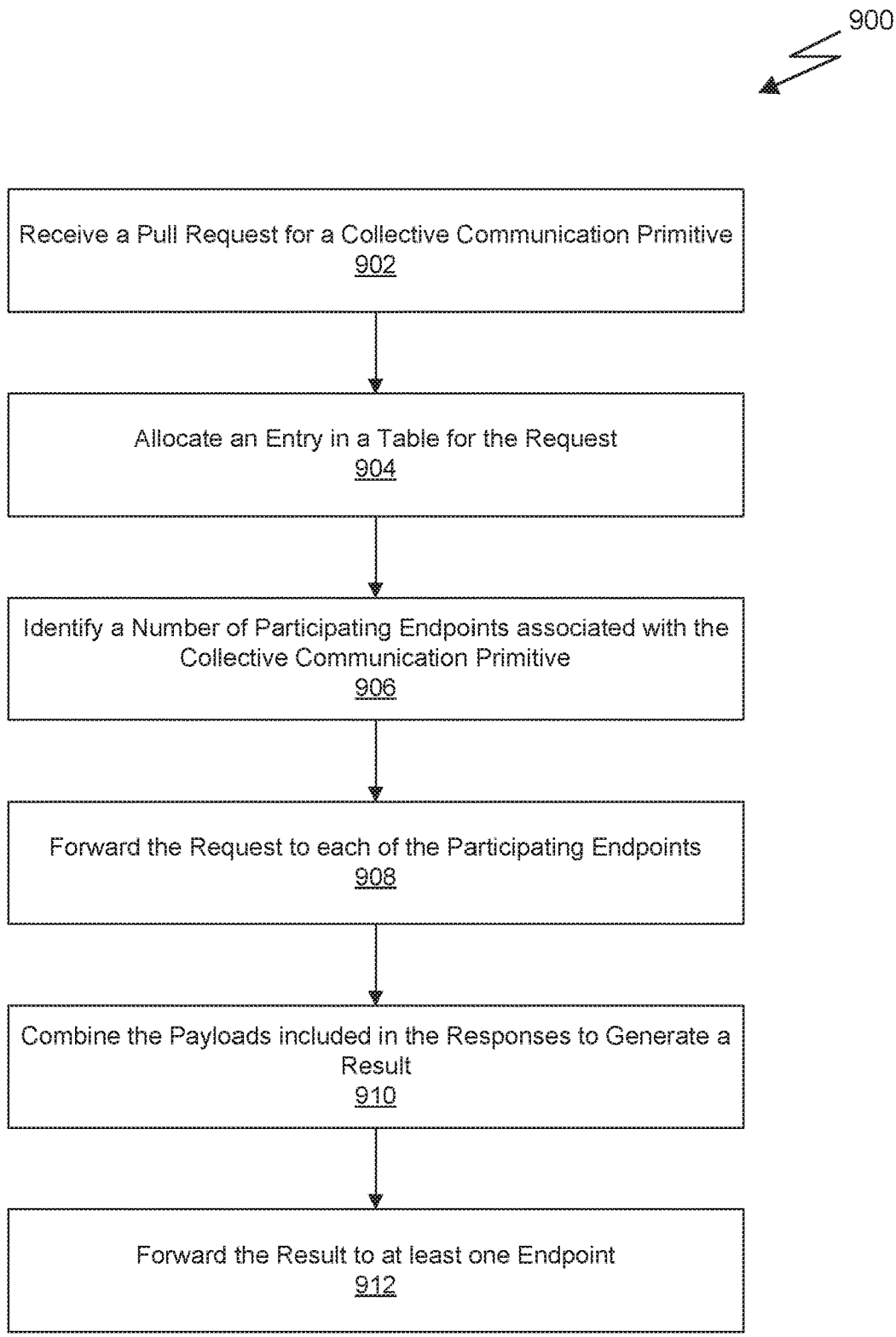
FIG. 9 is a flow diagram of a method that illustrates a pull mechanism for implementing in-network computations, in accordance with some embodiments.

FIG. 9 is a flow diagram of a method 900 that illustrates a pull mechanism for implementing in-network computations, in accordance with some embodiments.

At step 902, a pull request associated with a collective communication primitive is received at a network device. The network device is in communication with a plurality of endpoints via a network. In an embodiment, the pull request comprises a frame including a header and a payload. The payload may include one or more data elements, where each data element comprises a value in a particular format (e.g., 32-bit integer, 32-bit floating point, etc.).

At step 904, an entry in a table is allocated for the pull request. In some embodiments, the entry is allocated when no entry for the pull request is currently included in the table. In some embodiments, the table is implemented in a cache unit and, upon determining that the cache unit is full, a candidate entry in the cache unit is identified based on an eviction policy. A partial response for the candidate entry is generated and the candidate entry is evicted from the cache unit to make room for the entry. In some embodiments, when the table is full, the pull request can be delayed until an entry in the table is free. In other embodiments, the network device can be configured to notify the endpoint that sent the pull request that the entry cannot be allocated at this time and the endpoint can retransmit the pull request at a later point in time.

At step 906, one or more participating endpoints associated with the pull request is identified. In an embodiment, a network address is read from a header of the pull request. A multicast region table is queried based on the network address and the one or more participating endpoints are identified based on the query. For example, the network address is compared to entries in the multicast region table to determine if the network address is included in a range of addresses in a global shared address space allocated to a multicast region. If the network address matches a particular multicast region in the multicast region table, then an entry for that region is read to identify a list of participating endpoints for that multicast region.

At step 908, the pull request is forwarded to each of the one or more participating endpoints via a multicast capability of the network device. Again, the pull request is equivalent to a load request for one or more values stored in a local address space of each participating endpoint. Therefore, the pull request is multicast to the one or more participating endpoints to request the values from each of the participating endpoints. Each participating endpoint transmits a response to the pull request back to the network device.

At step 910, for each response associated with the collective communication primitive received by the network device, a payload of the response is combined with an intermediate result stored in an entry of a table maintained by the network device. In an embodiment, the table is a reduction table. In some embodiments, the reduction table is implemented in a cache unit of the network device.

In some embodiments, a particular response associated with the collective communication primitive is received from a second network device and can include a payload having an intermediate result corresponding to an in-network computation corresponding to two or more participating endpoints connected, either directly or indirectly, to the second network device.

At step 912, a pull response is generated by the network device and is forwarded to at least one participating endpoint. A payload of the pull response includes the intermediate result calculated based on one or more responses associated with the collective communication primitive received at the network device from two or more participating endpoints.

It will be appreciated that the method 900 can be performed in a network device by hardware, software, or some combination of hardware or software. For example, an ASIC in the network device can be configured to implement logic for implementing the steps of method 900. Alternatively, a network device can include a general processor or microcontroller that is configured to execute instructions that cause the network device to implements the steps of method 900.

The pull mechanism is only one mechanism for implementing in-network computations through what is essentially a multicast read request associated with a network address. A second mechanism for implementing in-network computations is a push mechanism that is essentially a multicast store request associated with a network address, which is described in more detail below.

Push Mechanism

Figure 10:
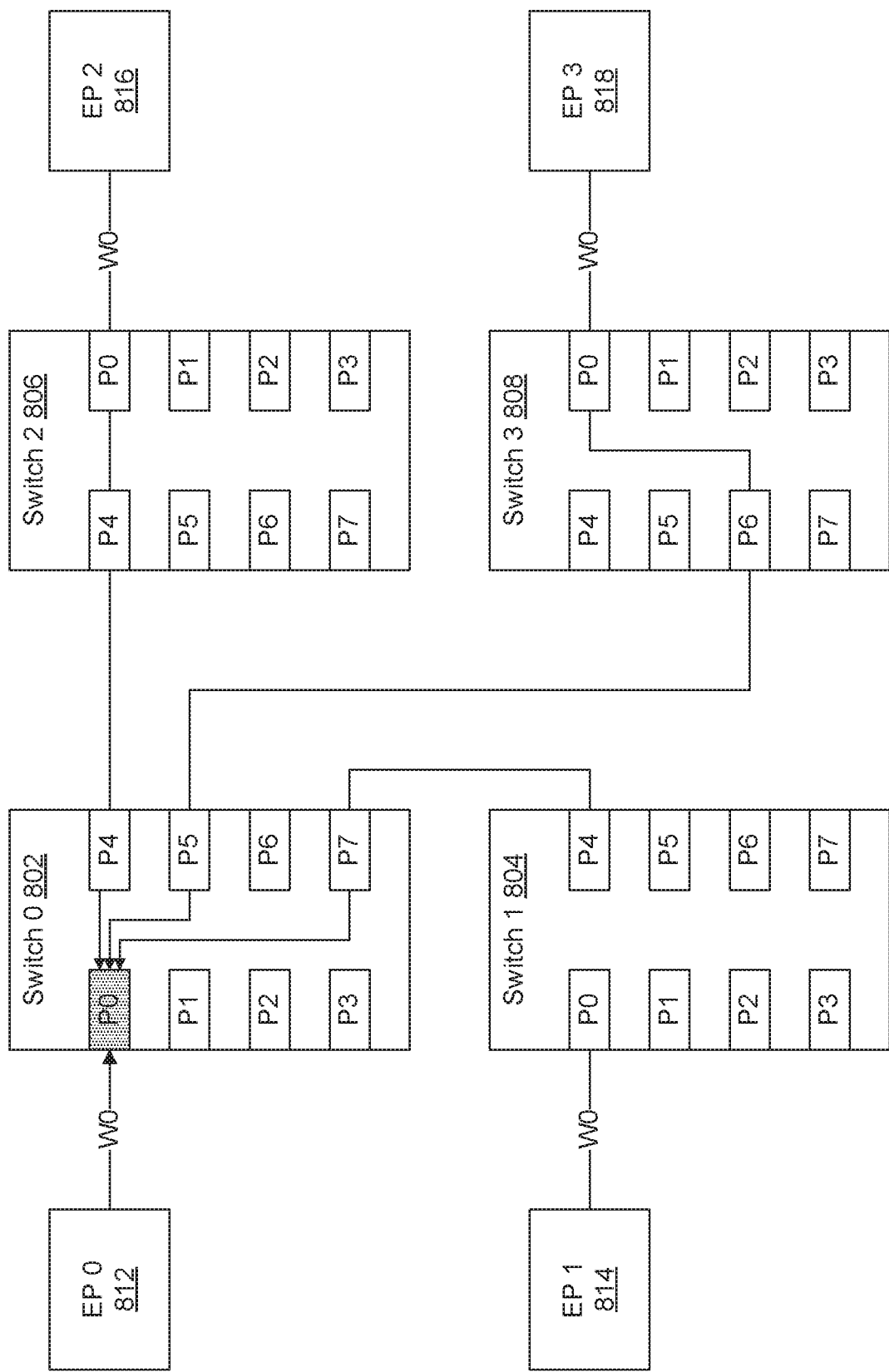
FIG. 10 illustrates a push mechanism for in-network computations, in accordance with some embodiments.

FIG. 10 illustrates a push mechanism for in-network computations, in accordance with some embodiments. As depicted in FIG. 10, four endpoints are participating in an MCR: EP 0 812, EP 1 814, EP 2 816, and EP 3 818. EP 0 812 is connected to port P0 of a first network device 802; EP 1 814 is connected to port P0 of a second network device 804; EP 2 816 is connected to port P0 of a third network device 806; and EP 3 818 is connected to port P0 of a fourth network device 808. Again, additional participating endpoints could be connected to available ports of any of the four network devices 802, 804, 806, 808 and/or additional network devices could be connected to the network.

Unlike the pull mechanism discussed above, the push mechanism allows each participating endpoint to transmit a push request to the network independently. There is no need for synchronization between participating endpoints using a Barrier primitive. Instead, once each participating endpoint is finished manipulating a local copy of a data element, the participating endpoint issues a push request to the network. The push request includes a header and a payload, with one or more data elements included in the payload.

Each network device includes logic 130 configured to determine a root port associated with each network address corresponding to an MCR. In an embodiment, the root port associated with a particular network address can be determined by applying a modulo operation to the network address using a divisor equal to the number of ports in the network. For example, if each network device includes 8 ports and there are four network devices in the network, then the divisor is equal to 32. The result is that the network addresses are distributed evenly among the available ports. It will also be appreciated that the root port does not need to be connected to a participating endpoint either, as any available port can be specified as the root port. In some embodiments, each packet can also be assigned a root endpoint by applying a different modulo operation to the network address. In this modulo operation, the divisor can be set equal to the number of participating endpoints such that the network address is mapped to exactly one participating endpoint. The push requests are routed to the root port, and the result of the reduction operation, once complete, can then be unicast to the root endpoint or multicast to all participating endpoints.

For example, as depicted in FIG. 10, port P0 of a first network device 802 is determined to be the root port for a plurality of push requests (WO) issued by the participating endpoints 812, 814, 816, 818. It will be appreciated that using the modulo operation evenly distributes collective communication primitives associated with different network addresses in the MCR around the network, with each distinct network address being forwarded to a particular root port. However, other techniques for determining the root port are also contemplated, such as dividing the range of network addresses in the MCR into equal sub-ranges and assigning each sub-range to a separate port. For example, when the number of unique addresses in the MCR is equal to 1024 (0x400), then the first 256 network addresses can be assigned to a first port, the second 256 network addresses can be assigned to a second port, the third 256 network addresses can be assigned to a third port, and the fourth 256 network addresses can be assigned to a fourth port.

The efficiency of balancing the load for a given application depends on how many unique addresses are used to generate push requests and how many different participating endpoints are included in the network. For example, if the network includes 16 participating endpoints, but the program executed by the endpoints only generates push requests for one network address, then all push requests will be distributed to one root port of a single network device, which will handle 100% of the processing for the in-network computation. Instead, if the program executed by the endpoints generates push requests to 16 different network addresses, then the distribution of the processing to various network devices will depend on the algorithm for determining the root port discussed above and how well that algorithm distributes the 16 distinct network addresses among the different devices.

In some embodiments, when the first network device 802 receives a push request, the logic 130 determines whether the network address included in the header of the push request is associated with one of the MCRs in the MCR table 132. If the network address is associated with a particular MCR, then the logic 130 determines for the root port based on the network address, and the push request is forwarded to the root port, in either the first network device 802 or a different network device.

As the push request is received at the root port, an entry in the reduction table can be allocated in that network device. As each new push request associated with the same network address is received at the root port, the payload from those entries is combined with the intermediate reduction result using a reduction operator specified for the reduction operation. Similar to the pull mechanism discussed above, the entry in the reduction tables includes a field to store an expected number of responses that, once received, indicates that the reduction is complete, a field to store an intermediate reduction result, and a field to store a count for the number of push requests received for this entry. As each push request is received and combined with the intermediate reduction result, the count is incremented until the count is equal to the expected number of responses, at which point the logic 130 generates one or more responses to the push request. In an embodiment, a single response is generated and forwarded to the root endpoint. A payload of the response will include the intermediate reduction result. In other embodiments, the logic 130 generates a response forwarded back to each participating endpoint via the multicast capability so that every participating endpoint receives a response corresponding to the push request generated by that endpoint, where the response includes the intermediate reduction result combined from all participating endpoints.

Like the pull mechanism, a situation can occur where a reduction table is unavailable to handle a new push request. For example a number of in-flight collective communication primitives have been allocated entries in the reduction table but have not yet completed. In such cases, the logic 130 can generate a response that is forwarded back to the source endpoint that indicates the push request failed. Alternatively, the logic 130 can implement an eviction policy that selects one of the entries in the reduction table for eviction. For example, the eviction policy can be a least recently used (LRU) policy that evicts the entry that includes the longest delay since the last push request for that entry arrived at the network device. It will be appreciated that any eviction policy is contemplated as being within the scope of the present disclosure, including first-in, first-out. In yet another embodiment, a credit-based system can be used to ensure push requests can be allocated an entry in the reduction table before the push request is transmitted from the participating endpoints.

When an eviction occurs, the logic 130 can generate a partial response that is transmitted to a root endpoint or all endpoints. In an embodiment, the partial response can include a flag in the header that indicates the result is only a partial result of the reduction operation so that the endpoint is aware that the value in the payload does not represent the total value. Similar to the pull mechanism, the partial response can include an indication of the participating endpoints that contributed to the partial result in the header or payload of the partial response. The indication can include a count of the total number of participating endpoints that contributed or a list of endpoint identifiers for each of the participating endpoints that contributed to the partial result. Each endpoint must be configured to process a partial result and anticipate combining additional partial result responses at a later point in time.

Figure 11:
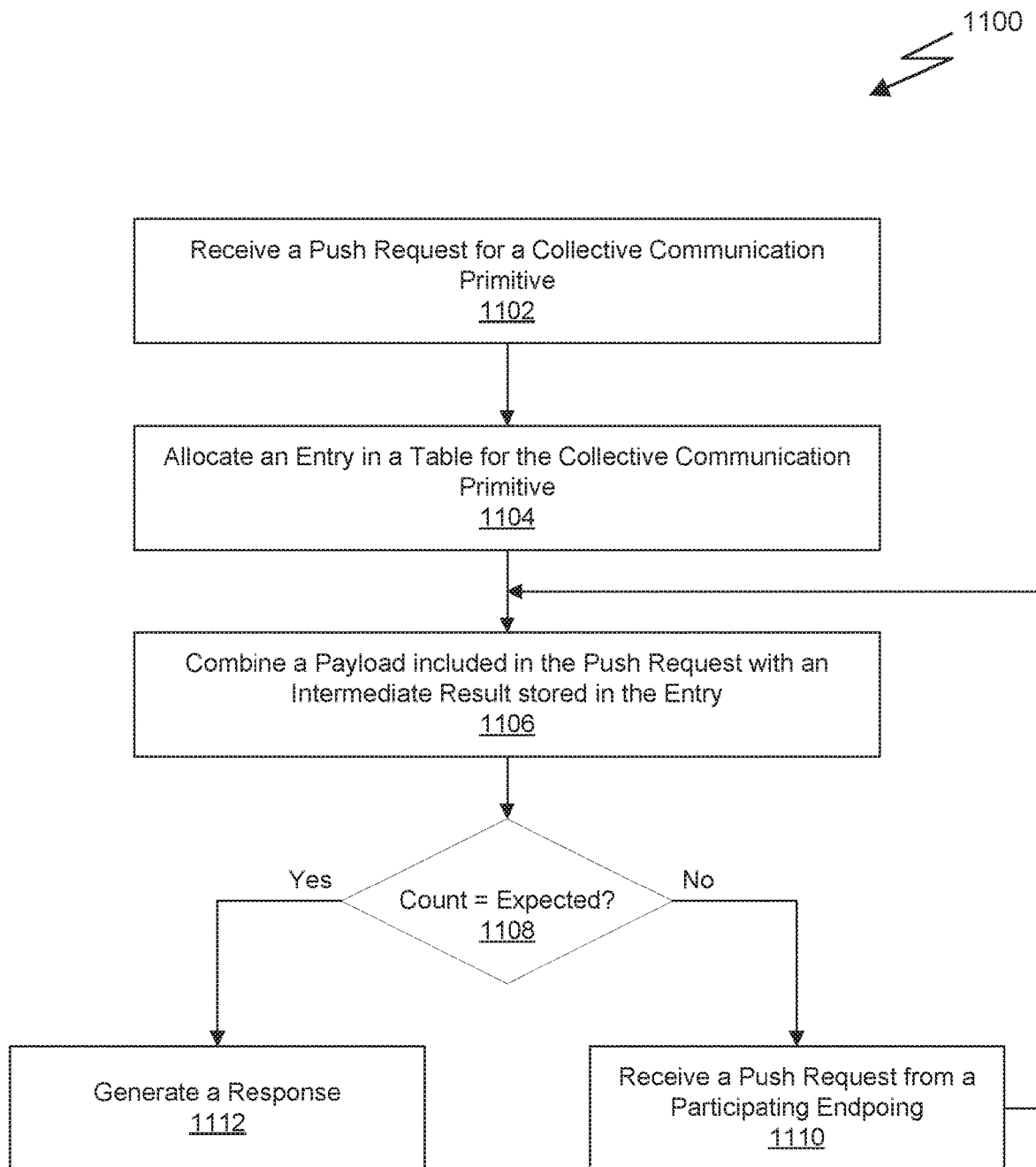
FIG. 11 is a flow diagram of a method that illustrates a push mechanism for implementing in-network computations, in accordance with some embodiments.

FIG. 11 is a flow diagram of a method 1100 that illustrates a push mechanism for implementing in-network computations, in accordance with some embodiments.

At step 1102, a push request associated with a collective communication primitive is received at a network device. The network device is in communication with a plurality of endpoints via a network. In an embodiment, the push request comprises a frame including a header and a payload. The payload may include one or more data elements, where each data element comprises a value in a particular format (e.g., 32-bit integer, 32-bit floating point, etc.).

At step 1104, an entry in a table maintained by the network device is allocated to the push request. In some embodiments, the table is implemented in a cache unit and, upon determining that the cache unit is full, a candidate entry in the cache unit is identified based on an eviction policy. A partial response for the candidate entry is generated and the candidate entry is evicted from the cache unit to make room for the entry. In some embodiments, when the table is full, the push request can be delayed until an entry in the table is free. In other embodiments, the network device can be configured to notify the endpoint that sent the push request that the entry cannot be allocated at this time and the endpoint can retransmit the push request at a later point in time.

At step 1106, a payload in the push request is combined with an intermediate result stored in the entry. In an embodiment, the combining can be performed as a calculation based on an operator. In some embodiments, the operator can be specified in the push request. In other embodiments, the operator is specified in a multicast region table.

At step 1108, logic determines whether additional push requests associated with the collective communication primitive are expected to be received by the network device. In some embodiments, the logic is configured to read a network address from a header of the push request, query a multicast region table based on the network address to identify a number of expected push requests associated with the collective communication primitive, and compare the number of expected push requests to a count stored in the entry of the table.

If additional push requests are expected to be received, then, at step 1110, the logic waits to receive one or more additional push requests associated with the collective communication primitive. As additional push requests are received, the method returns to step 1106 where a payload associated with each additional push request is combined with the intermediate result stored in the entry.

In some embodiments, the network device is connected to a second network device. At least one additional push request is received by a second network device. The second network device is configured to, based on a query of the multicast region table, identify a root port of the network device associated with the collective communication primitive and forwards the at least one additional push request to the root port of the network request.

However, returning to step 1108, if additional push requests are not expected to be received, then, at step 1112, the logic generates a push response that is forwarded to at least one participating endpoint. The payload of the push response includes the intermediate result calculated based on one or more push requests associated with the collective communication primitive received at the network device from at least one participating endpoints.

It will be appreciated that the method 1100 can be performed in a network device by hardware, software, or some combination of hardware or software. For example, an ASIC in the network device can be configured to implement logic for implementing the steps of method 1100. Alternatively, a network device can include a general processor or microcontroller that is configured to execute instructions that cause the network device to implements the steps of method 1100.

Figure 12:
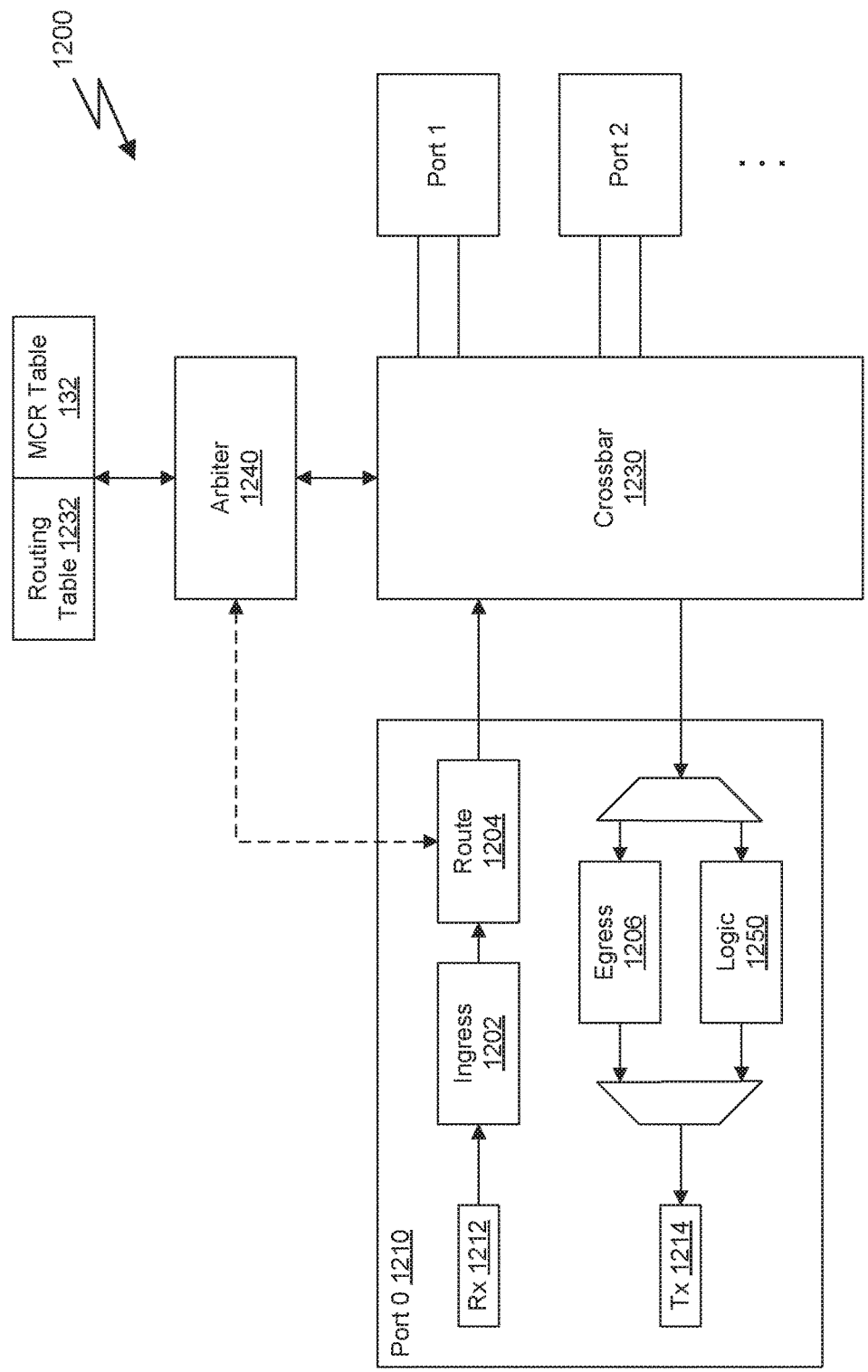
FIG. 12 illustrates a network device, in accordance with some embodiments.

FIG. 12 illustrates a network device 1200, in accordance with some embodiments. As depicted in FIG. 12, the network device 1200 includes a plurality of ports 1210 connected through a crossbar 1230. The crossbar 1230 is a configurable switch that can connect any port 1210 with any other port 1210 of the network device 1200. In some embodiments, the crossbar 1230 can be connected to an arbiter 1240, which is connected to a routing table 1232 and the MCR table 132. The arbiter 1240 is configured to help make decisions on which ports to connect during any given transmission opportunity in order to facilitate transfer of the data packets from an incoming port to an outgoing port.

In some embodiments, each port 1210 includes a receiver 1212 and a transmitter 1214. The receiver 1212 is configured to receive a signal via a physical communications medium, such as a wired or wireless channel via Ethernet, Wi-Fi, or the like. Data packets are transmitted to ingress logic 1202, which can decode the data packets to determine how to forward the packets to the correct destination. In an embodiment, the ingress logic 1202 is configured to decode a header and/or a payload of the data packet to determine one of a source address, a destination address, or the like. If the packet is an Ethernet packet, then the header may contain MAC addresses as the destination address and source address. If the packet is an IP packet, then a payload of the packet may contain an IP header that includes IP addresses as the destination address and source address, where the payload is encapsulated in an Ethernet frame or some other link layer frame that includes a frame header and/or footer.

In an embodiment, the network device includes a routing functionality and can be referred to as a router. The ingress logic 1202 can forward the destination address to the route logic 1204, which communicates with the arbiter 1240 to determine which port of the network device 1200 is specified to forward the packet to the next hop of the network. The arbiter 1240 can query the routing table 1232, using the destination address, to determine the outgoing port and then configure the cross bar to connect the incoming port with the outgoing port. In other embodiments, the network device 1200 is a switch and does not include a routing capability. In such embodiments, the route logic 1204 may be omitted and the ingress logic 1202 can implement the switch capability with the arbiter 1240, using the destination address to determine which port is the outgoing port.

The crossbar 1230 connects a first port 1210 that receives an incoming packet with a second port 1210 for transmitting an outgoing packet, based on the decision of the arbiter logic 1240. The arbiter logic 1240, using either the routing table 1232 and/or the MCR table 132, determines which port is configured to transmit the packet to a next node in the network, including one of a second network device or an endpoint connected to the port 1210. The arbiter logic 1240 then configures the crossbar 1230 to connect the first port 1210 with the second port 1210.

In a conventional network device, the packet would be processed by the egress logic 1206 and prepared for transmission over the network by the transmitter 1214. However, network device 1200 also includes logic 1250 that is capable of performing in-network computations related to collective communication primitives associated with a MCR in the MCR table 132. The logic 1250 can include one or more ALUs or other specialized hardware for performing reduction operations, gather operations, scatter operations, and the like. Although not shown explicitly, the arbiter logic 1240 can be connected to a multiplexor and demultiplexor connected to the egress logic 1206 and logic 1250 in order to process the packet according to conventional switch/routing functions with egress logic 1206 or to process the collective communication primitive with logic 1250.

It will be appreciated that the logic 1250 is shown within the egress path of a port and, therefore, the collective communication primitive is processed by the port just prior to transmission to the network. In such cases, outgoing transmission of a packet can be delayed by the port while awaiting other packets associated with a given operation. For example, in a reduction operation, a packet from each endpoint may be expected to arrive at the port and, therefore, the port may delay forwarding the packet to the destination endpoint until the total number of expected packets for that reduction operation have arrived at the port. This is inconsistent with the conventional egress logic 1206 that is configured to forward the packet to the destination node without consideration of other packets arriving from participating endpoints to an in-network computation.

In some embodiments, the logic 1250 can be moved from the egress path to the ingress path of the port 1210. Incoming requests received at the receiver 1212 could cause an entry to be allocated in the reduction table implemented by the logic 1250. However, responses from different endpoints are received on different ports. Therefore, packets received in the ingress path in one port may need to be routed to the logic 1250 in a different port of the network device 1210 that holds the entry in the reduction table corresponding to that response. In other words, the reduction table in a network device 1200 is distributed between the different ports 1210 of the device and a response received on an input port may not include an entry in the portion of the reduction table stored within the logic 1250 of that input port.

Furthermore, in cases where the logic 1250 is implemented in the ingress path, the logic 1250 would need to receive input from both the receiver 1212 and the crossbar 1230, allowing the crossbar 1230 to operate as a virtual receiver for the port 1210. Alternatively, the packet from the crossbar 1230 could be transmitted to the next hop in the network by the transmitter 1214, and the next hop could reflect that packet back to the receiver 1212 to be processed by the logic 1250. However, this type of implementation could increase network traffic unnecessarily and requires endpoints to implement routing capabilities by determining that a received packet is addressed back to the previous hop rather than the endpoint. Nevertheless, some types of collective communications primitives may require the response to be broadcast or multicast to a set of participating endpoints and, therefore, even when the logic 1250 is located in the egress path of the port, such logic 1250 may either need to be able to redirect the output packet back to the ingress logic 1202 to be forwarded to the participating endpoints attached to other ports 1210 of the network device 1200, or the output packet can be sent to the next hop before being reflected back to the port for routing to one or more participating endpoints at the other end of the network.

In yet other embodiments, the network device 1200 can implement the logic 1250 externally to the ports 1210, by connecting the logic 1250 directly to the crossbar 1230 and using the arbiter 1240 to route packets from an input port to the logic 1250 via the crossbar 1230 and, when the output packet is ready to be transmitted to one or more of the participating endpoints, routing the packet from the logic 1250 to the output port(s) via the crossbar 1230. In this manner, the reduction table (or logic 1250) is not distributed among the plurality of ports 1210 but is instead shared by all ports of the network device 1200.

In some embodiments, the network device 1200 can implement virtual channels. A virtual channel can be useful to avoid protocol deadlocks. In some embodiments, a first virtual channel can be utilized for requests and a second virtual channel can be utilized for responses. In yet other embodiments, a third virtual channel can be utilized when packets need to be sent to a next hop in the network in order to be reflected back to the same port of the network device 1200.

Figure 13:
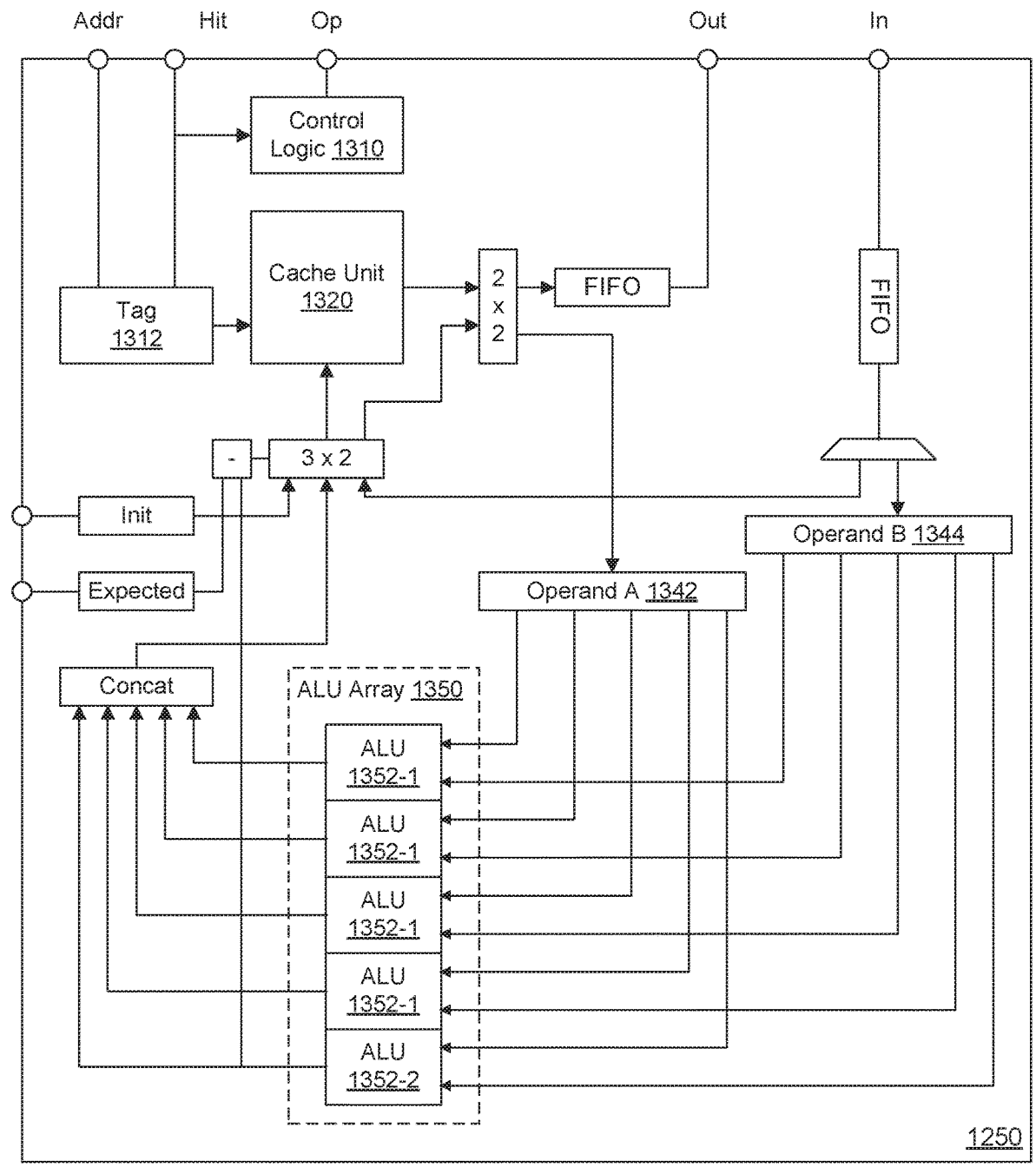
FIG. 13 illustrates the logic included in a port of the network device of FIG. 12, in accordance with some embodiments.

FIG. 13 illustrates the logic 1250 included in a port 1210 of the network device 1200 of FIG. 12, in accordance with some embodiments. As depicted in FIG. 13, the logic 1250 includes control logic 1310, a cache unit 1320, a tag determination unit 1312, and an ALU array 1350. In an embodiment, the cache unit 1320 is utilized as a reduction table, where entries in the cache unit 1320 are utilized as entries in the reduction table.

More specifically, as a packet is received at the logic 1250, a destination address (Addr) is read from the header of the packet by the tag unit 1312 to determine if the destination address corresponds with an entry in the cache unit 1320. If the address does not hit in the cache, then the payload (In) of the packet is routed to the cache unit 1320 and stored as a new entry in the cache unit 1320. As shown in FIG. 13, the payload is stored in a FIFO, and the control logic 1310 configures a multiplexor such that the payload is routed to a 3×2 digital switch that routes connects the payload to the cache unit 1320.

However, if the tag unit 1312 determines that the address hits in the cache unit 1320, then an entry of the reduction table was previously allocated based on an earlier arrived packet. In such cases, the control logic 1310 controls a 2×2 digital switch to load the value stored in the cache entry into a first operand register 1342. The control logic 1310 also loads the value in the payload into a second operand register 1344. In some embodiments, the values can comprise a number of data elements. For example, as shown in FIG. 13, the payload can comprise four 32-bit data elements totaling 128-bits of data elements. The payload can also include a 16-bit count that indicates a number of endpoints associated with the values stored in the data elements. If the payload in the data packet is derived from a single endpoint, then the value in the 16-bit count can be set equal to one. However, if the packet is the result of an earlier reduction of a number of endpoints in a separate network device as part of an intermediate hop, as described in a hierarchical in-network computation, then the 16-bit count can be greater than one.

The operands are then combined by the ALU array 1350 based on an operator (Op) specified by the MCR table 132. The operator can be transmitted to the logic 1250 by the arbiter logic 1240 as read from the MCR table 132 when the packet is forwarded to the output port.

The ALU array 1350 can include a number of ALUs 1352. For example, as shown in FIG. 13, the ALU array 1350 can include four 32-bit ALUs 1352-1 and one 16-bit ALUs 1352-2. The ALUs 1352-1 perform an element-wise operation on the operands based on the operator. For example, each data element in operand A can be added to a corresponding data element in operand B. The ALU 1352-2 also sums the 16-bit count values to track a total number of endpoints associated with the result of the operation. The result of the operation is routed to concatenation logic, which forwards a result payload to the 3×2 digital switch.

The 16-bit count value is also routed to a comparator (−) that compares the count to an expected value. The expected value is forwarded to the logic 1250 from the arbiter logic 1240 and can be read from the MCR table 132. If the 16-bit count value is less than the expected value, then the 3×2 digital switch routes the result payload to the cache unit 1320, which is stored in the corresponding entry of the cache unit 1320.

As additional packets are received, the payload in the entry of the cache unit 1320 is updated until the 16-bit count value is equal to the expected value. At this point, all payloads from the participating endpoints have been received by the logic 1250, and the packet is ready to be forwarded to the destination address. The 3×2 digital switch and the 2×2 digital switch are configured to forward the result payload to a FIFO before the result payload is output by the logic 1250 in an outgoing packet. For example, the payload of the packet received by the logic 1250 can simply be replaced by the result payload before being forwarded to the transmitter 1214.

It will be appreciated that the data elements are not limited to 32-bit and can be 16-bit, 64-bit, or any other size, in various embodiments. In some embodiments, the logic 1250 is configured to perform the operations in a different precision than the data elements. For example, the ALUs 1352-1 can be configured to generate a result in 64-bit precision when the data elements are received in 32-bit precision. The data elements can be converted at the input and output ports of the logic 1250 and all calculations can be performed at the higher precision. Performing the operation in a different precision from the data elements can apply to both floating-point elements as well as integer elements.

In some embodiments, the ALUs 1352 are integer arithmetic logic units. In other embodiments, the ALUs 1352 can be implemented as floating point units (FPUs) such that the array of processing elements 1350 is an array of FPUs 1352. This can be especially useful when the reduction operation utilizes a multiplication operator rather than an addition operator. In yet other embodiments, the ALUs 1352 can include both an integer unit and a floating-point unit such that the in-network computation can be performed on data elements of either data type.

It will be appreciated that floating-point operations are not necessarily deterministic and the result can depend on the order of the received data elements. In the pull technique, deterministic order can be preserved by forwarding the request to each participating endpoint sequentially and waiting for the response from each endpoint before sending the request to the next participating endpoint. In the push technique, deterministic order can only be preserved if the reduction table includes enough memory to store all of the received entries prior to execution of the calculations, thereby enabling a particular order of the data elements in the computation.

It will also be appreciated that the cache unit 1320 has a limited number of entries. If the cache unit 1320 is full when a new packet is received that results in a cache miss, the control logic 1310 can be configured to evict a cache line based on an eviction policy. Eviction of the cache line will result in the payload stored in the cache line being pushed to the output port of the logic 1250. The cache line is then invalidated and can be overwritten.

In some embodiments, when a new packet arrives and a new cache line is allocated, the payload in the cache line can be set to an initial value, which can be stored in a register (Init). Alternatively, the initial value of the payload is read from the payload of the first packet to arrive at the port 1210.

In some embodiments, the cache unit 1320 can be replaced with an addressable on-chip memory, referred to as a table, a set of registers, or the like. However, it will be appreciated that resource management protocols for utilizing such a memory may be more complex than a cache unit 1320.

Injection Limiting Through Wave Synchronization

The multicast capability within each network device causes a single packet injected into the network to be replicated many times in order to reach multiple multicast endpoints. This multicast capability can lead to increased congestion within the network as each packet traversing the network may be replicated. Without any particular scheme for regulating traffic on the network, the network can quickly become inundated with packets, stalling the traffic on the network and leading to overall inefficiency in the in-network computations.

In the pull model, unregulated injection can stall the source of data packets relatively quickly and lead to back-pressure, negatively affecting any other types of data packets that the endpoint may need to transmit over the network. In a network that is not dedicated to a single task, this traffic can reduce a Quality of Service (QoS). In the push model, the data packets will be allowed to be injected into the network at the endpoint, but frequent evictions reduce the effectiveness of the in-network computation and further increase congestion, leading to decreased performance and reduced QoS in shared systems. Furthermore, the reduction requests and the multicast writes to distribute the result to a number of participating endpoints interfere and, therefore, cannot overlap, which decreases performance.

An effective regulatory scheme can be implemented using credits to limit the number of outstanding operations that are currently in-process within the network. More particularly, given a number of network devices capable of performing in-network computations, the fabric controller can calculate, a priori, a total network capacity C that, e.g., can be utilized to ensure that no more than C data elements are being reduced in the network at one time. In some embodiments, C is equal to a total number of entries in the reduction tables implemented within cache units of the network device(s). In other embodiments, C can be a function dependent on the total number of entries in the reduction tables implemented within cache units of the network device(s). For example, C can be a percentage of the total number of entries, where the percentage is less than 100%, reflecting the knowledge that the total number of entries can be distributed among a plurality of network devices and that a number of operations directed at a single network device at once could cause unwanted congestion or evictions, even if the total number of operations is less than the total number of entries in the network as a whole. In other words, C can be set equal to a level that allows for some congestion but ensures that the total congestion and/or evictions remains at a manageable level. In some embodiments, C can be set based on a service level agreement that allocates a percentage of network bandwidth to various users associated with a datacenter or a network that has multiple tenants. For example, a first user can be allocated 50% of the total network capacity and a second user can be allocated 25% of the total network capacity, and so forth. The number of credits available to an application of any particular user, operating on one or more VMs in the datacenter, is then limited to a percentage of the total network capacity.

Wave synchronization refers to a regulatory scheme that limits an endpoint to inject a maximum number of data elements to be reduced in parallel in the network. For example, a DMA engine can be configured to inject requests (e.g., loads or store requests corresponding to pull or push mechanisms, respectively) into the network for 128 different addresses in order to initiate 128 different in-network reduction operations. However, if the total capacity of the network is equal to 32 entries in, e.g., two different network devices, with two entries per port and 8 ports per network device, then only a maximum of 32 requests should be injected into the network at a time. Consequently, the 128 different addresses are divided into waves of 32 requests for 32 corresponding addresses. A first wave of 32 requests can be injected into the network. Then, once all 32 reduction operations are complete, a second wave of 32 requests is injected into the network, and so forth. As used herein, a wave refers to a group of collective communication primitives (e.g., data packets) injected into the network and logically associated with a single allocated counter such that the responses to the collective communication primitives can be counted by the counter to determine whether the processing of all collective communication primitives in the group injected into the network is complete. In other words, a wave acts to separate the network traffic into manageable chunks to prevent the network from being overloaded or congested, each wave of requests allows a smaller number of requests to be processed by the network at a time, and each wave follows the previous wave like swells traveling across an ocean and landing on a beach. Absence of wave injection limiting could result in all of the requests being injected into the network at once, creating a tsunami that overwhelms the network.

In some embodiments, synchronization can be hidden by allowing multiple waves to be injected into the network at once. The size of a wave (e.g., the number of data elements or distinct addresses associated with a single wave) is set to $$\left\lceil \frac{C}{k} \right\rceil$$

where $0<k\leq C$. Then, k waves can be outstanding at any one time such that as the processing of any wave is completed, a new wave can be injected into the network while other outstanding waves continue processing. This allows the network utilization to be more consistent than if the network traffic was significantly reduced waiting for the last few packets of a wave to be transmitted to the participating endpoints before starting new reduction operations. For example, as in the previous example where C is set equal to 32, k can be equal to four, allowing waves of eight elements to be injected into the network while simultaneously allowing up to four waves to be in flight at the same time. In practice, one or more waves may finish earlier than the other waves that are currently in-flight, allowing new waves to be injected into the network prior to all four waves being complete. It will be appreciated that the waves can be injected into the network by multiple endpoints and, therefore, waves should be injected by the different endpoints in a common order based on the wave identifiers assigned to each wave. This applies equally to both the pull mechanism and the push mechanism.

Figure 14A:
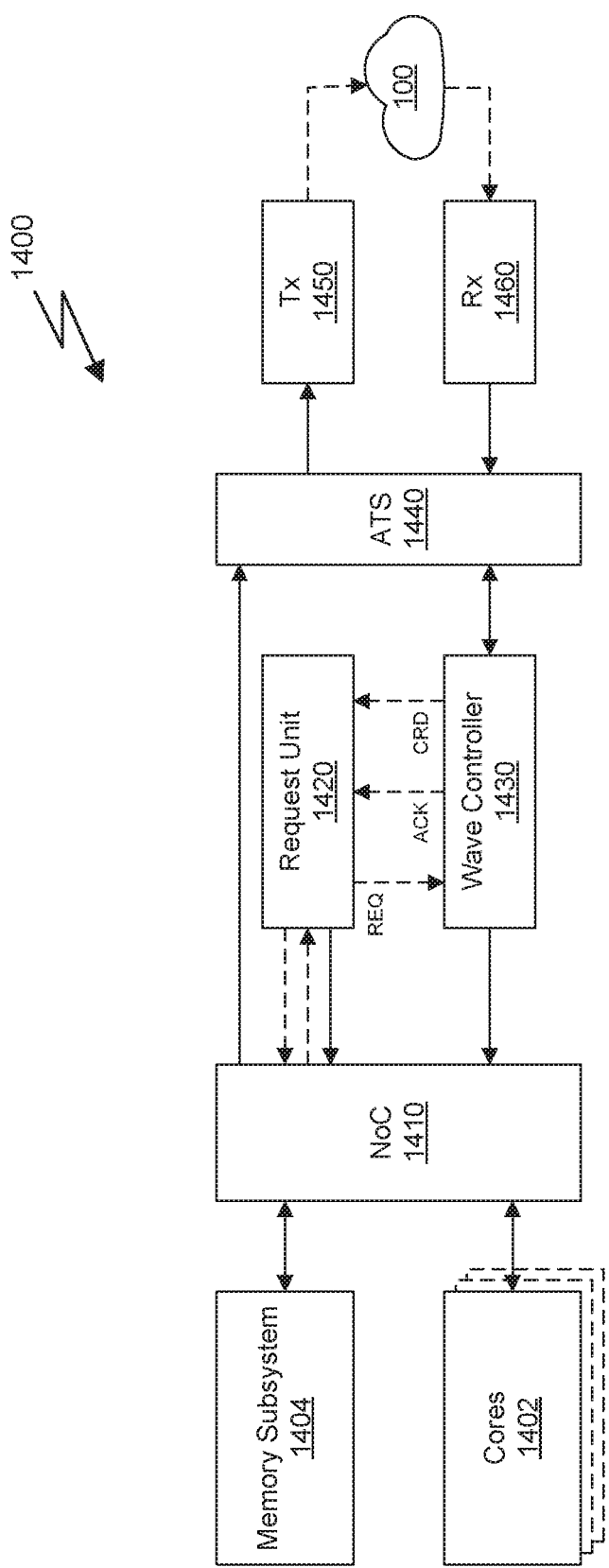
FIG. 14A illustrates an endpoint configured to utilize wave synchronization, in accordance with some embodiments.

FIG. 14A illustrates an endpoint 1400 configured to utilize wave synchronization, in accordance with some embodiments. As depicted in FIG. 14A, the endpoint 1400 includes one or more cores 1402, a memory subsystem 1404, a Network on Chip (NoC) 1410, an offload engine 1420, a wave controller 1430, an address translation service (ATS) agent 1440, a transmitter 1450, and a receiver 1460. In an embodiment, the NoC 1410 includes a mesh interconnect that enables a plurality of cores 1402 to communicate with the memory subsystem 1404 as well as the offload engine 1420 and/or the ATS agent 1440. In some embodiments, the NoC 1410 can also include a switch and/or a routing functionality.

In an embodiment, a process to inject one or more collective communication primitives can be initiated by a processing core 1402 executing an instruction associated with one or more memory addresses that are mapped to a network address or the memory subsystem 1404 by executing a direct memory access (DMA) instruction (e.g., via a copy engine). In an embodiment, an offload request is issued by the processing core 1402 or the memory subsystem 1404 to the offload engine 1420. As used herein, an offload request refers to a request for the offload engine to generate a number of collective communication primitives to be injected into a network. The offload request can include a descriptor that indicates a type of the collective communication primitives (e.g., reduction requests via the pull mechanism) as well as a number of collective communication primitives to be generated by the offload engine 1420. The number of collective communication primitives can be specified via a starting address and an ending address corresponding to the range of network addresses for the one or more collective communication primitives. Alternatively, the number of collective communication primitives can be specified via a base address and a size, where the size indicates the range of addresses (i.e., local addresses, either physical or virtual memory addresses) corresponding to the range of network addresses for the one or more collective communication primitives.

In an embodiment, the offload request is transferred through the NoC 1410 to the offload engine 1420. The offload engine 1420 limits packet injection to the network based on available credits. If the offload engine 1420 does not have any available credits (i.e., if a counter associated with a credit value is zero), then the collective communication primitives cannot be forwarded to the network 100 via transmitter 1450. The offload engine 1420 is configured to request credits from the wave controller 1430, if available, and to split the one or more collective communication primitives associated with a particular offload request into one or more waves. It will be appreciated that the offload request can include a number, m, of addresses that is greater than a maximum number, n, of collective communication primitives for a wave. In such cases, the offload engine 1420 is configured to divide the m addresses into groups of n addresses, where each group of n consecutive addresses corresponds to a single wave. The offload engine 1420 then issues a credit request to the wave controller 1430 in order to request credits in order to generate the corresponding collective communication primitives that can then be injected into the network.

In an embodiment, the cores 1402 and/or the memory subsystem 1404 generate the offload request, and the offload engine 1420 subsequently generates the one or more collective communication primitives corresponding to the offload request to be injected into the network 100. In this manner, the offload request issued by software in the cores 1402 and/or the memory subsystem 1404 can offload generation of one or more collective communication primitives to a hardware engine that performs the wave synchronization function.

In an embodiment, the offload engine 1420 is a hardware unit that requests credits from the wave controller 1430 based on the number of collective communication primitives that need to be injected into the network 100. A credit request refers to a request for credits from the wave controller 1430, and can include a request for credits for one or more waves of collective communication primitives simultaneously. The wave controller 1430 attempts allocation of one or more counters within the wave controller 1430 to service the credit request from the offload engine 1420. A counter is a register or other logic that can be incremented or decremented to count packets received via a network interface. Each counter in the wave controller 1430 can be allocated for a particular wave and is used to track the completion of the wave by counting a number of packets received at the network interface via receiver 1460.

In an embodiment, the wave controller 1430 receives the credit request to allocate a counter from the offload engine 1420 and determines if a counter is available. In some embodiments, the wave controller 1430 can include a plurality of counters such that two or more waves can be tracked simultaneously by the wave controller 1430. In one embodiment, a register (e.g., a 128-bit memory unit) can be configured to store a number of counters (e.g., eight 16-bit counters, four 32-bit counters, etc.). In one embodiment, a most significant bit (MSB) of each counter indicates whether the counter is currently allocated to a wave or whether the counter is available for allocation. The wave controller 1430 returns an acknowledgment (ACK/NACK) signal that indicates whether a counter is allocated responsive to the request and a credit signal that indicates a number of credits issued to the offload engine 1420.

In an embodiment, the offload engine 1420 can include a temporary memory to store pending credit requests in the event that a counter cannot be allocated by the wave controller 1430. In such cases, the credit request is stored in the offload engine 1420 until a time period has expired and then the request is retransmitted to the wave controller 1430 in an attempt to allocate a counter for the wave. After one or more retry requests, the offload engine 1420 can send an error back to the core 1402 or memory subsystem 1404 that indicates the offload request could not be processed at this time. The credit request can also be evicted from the temporary memory when the retry request fails. However, if the retry request is successful, then the offload engine 1420 is issued credits for transmitting the wave of collective communication primitives to the network 100.

It will be appreciated that the credit request can include a request for credits for two or more wave simultaneously. In such cases, the wave controller 1430 will attempt to allocate a number of counters equal to the number of waves associated with the credit request, and will only issue credits if all of the counters for the number of waves can be allocated by the wave controller 1430. In some embodiments, the credit request can specify a number of waves and a number of credits per wave being requested, where each wave corresponds with an equal number of collective communication primitives. In other embodiments, the credit request can specify a size of each wave individually, such that the size of each wave can vary.

In one embodiment, upon receiving available credits, the offload engine 1420 can inject one or more waves of collective communication primitives into the network 100. Each collective communication primitive generated by the offload engine 1420 can be forwarded to the ATS 1440 via the NoC 1410. The ATS agent 1440 performs address translation between the virtual or physical memory addresses within the endpoint 1400 and network addresses in the global address space shared by the network elements. In other words, the ATS agent 1440 translates addresses from a local address space of the node 1400 to a global address space that includes one or more multicast regions (MCRs). The collective communication primitive is then sent to the transmitter 1450 and sent out over the network 100. As the in-network operation is completed in the network 100, a response to the collective communication primitive is received at the receiver 1460. The response is passed through the ATS 1440 and on to the wave controller 1430, which increments the counter allocated to the wave corresponding to that collective communication primitive before forwarding the response on to the destination (e.g., a core 1402 or memory subsystem 1404) via the NoC 1410.

In an embodiment, the offload engine 1420 appends a wave identifier to the collective communication primitive before the collective communication primitive is forwarded on to the network 100. In an embodiment, the wave identifier and/or the corresponding counter in the wave controller 1430 can be derived based on the address (e.g., network address, local virtual address, etc.) included in the response. For example, each wave identifier can be derived based on an offset of an address included in the response relative to a base address that is associated with the initial wave identifier, where each d number of contiguous addresses are associated with a different wave identifier. In an embodiment, the base address can be provided in the offload request. In some cases, the base address may be given as a network address, and the ATS can be used to translate the base address into a local virtual address, which is stored as the base address in the wave controller 1430. Consequently, the wave controller 1430 can derive the wave identifier using the base address and the local virtual address associated with each response. In other embodiments, the wave controller 1430 can be arranged in front of the ATS 1440 such that responses received from the network 100 include network addresses and all counting of responses are done relative to the global shared network address space prior to the network addresses being translated into the local virtual address space to be processed by the endpoint 1400.

It will be appreciated that the offload request can be offloaded from the cores 1402 and/or the memory subsystem 1404 such that multiple waves of collective communication primitives are generated sequentially by the hardware engine such that software executed by the cores 1402 and/or memory subsystem 1404 does not have to iterate through each memory address to generate separate and distinct collective communication primitives for each memory address. Instead, the distinct collective communication primitives are generated by the hardware offload engine 1420 as credits are made available by the wave controller 1430, making the injection limiting functionality mostly transparent to the software. In other embodiments, the software can retain control of generating the collective communication primitives after receiving an indication that credits have been allocated by the wave controller 1430 and/or the offload engine 1420. In an embodiment, the offload engine 1420 handles functions like dividing an offload request into one or more waves based on a size included in the descriptor of the offload request such that each wave is less than or equal to a maximum wave size, managing retry attempts when a credit request fails due to no counters being available in the wave controller 1430, and so forth. However, ultimately, the software executed by the cores 1402 and/or hardware or software in the memory subsystem 1404 generates the individual collective communication primitives transmitted to the network 100 once credits are successfully allocated for a given wave. In other embodiments, when software maintains control for generating the collective communication primitives, then the offload engine 1420 can be removed from the flow entirely and the software acts as the requesting entity rather than the offload engine 1420, sending the credit request to the wave controller 1430 directly. It will be appreciated in such embodiments that the offload request can be omitted as the software generates the credit requests directed to the wave controller 1430.

Figure 14B:
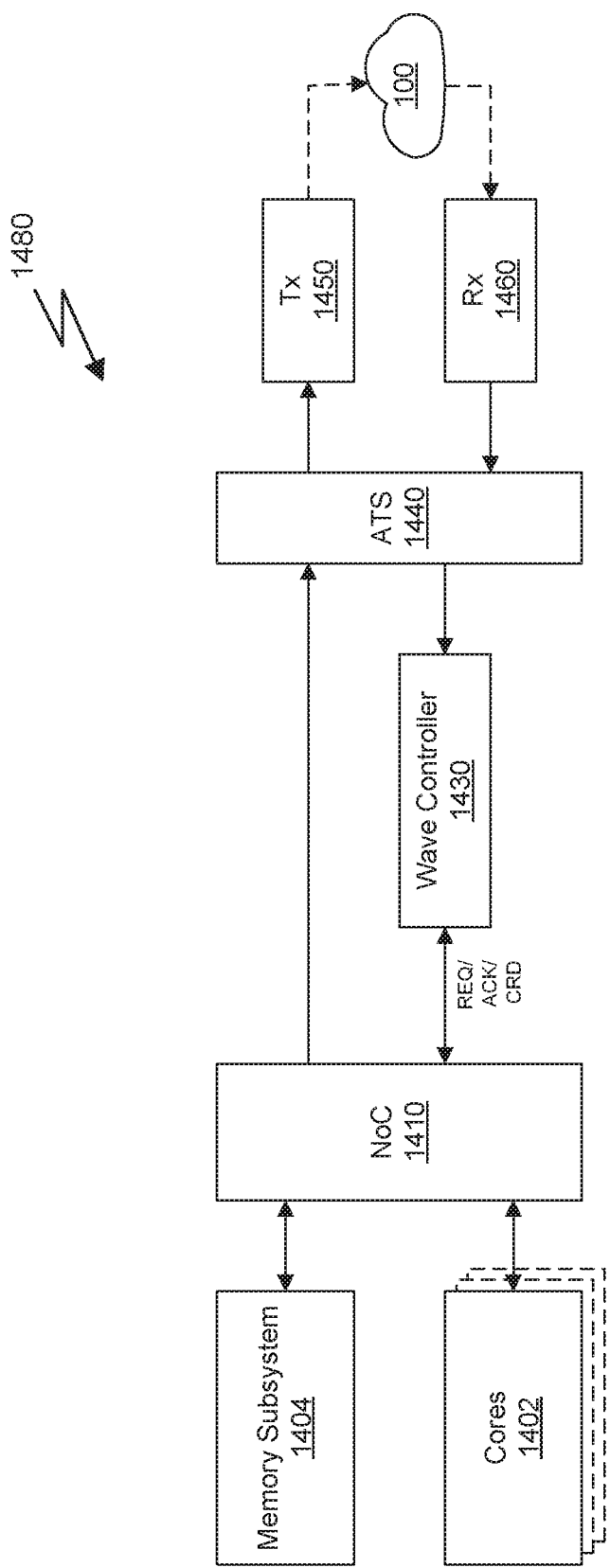
FIG. 14B illustrates an endpoint configured to utilize wave synchronization, in accordance with another embodiment.

FIG. 14B illustrates an endpoint 1480 configured to utilize wave synchronization, in accordance with another embodiment. As depicted in FIG. 14B, the endpoint 1480 is similar to the endpoint 1400 except that the endpoint 1480 does not include the offload engine 1420. Instead, credit requests are handled by software in the cores 1402 and/or the copy engines in the memory subsystem 1404. The software solution generates the collective communication primitives directly and, therefore, any collective communication primitive issued by the cores 1402 and/or the memory subsystem 1404 requires a corresponding credit to have been allocated by the wave controller 1430.

In one embodiment, the wave controller 1430 receives a credit request from a requesting entity, which is software executed within either one of the cores 1402 or the memory subsystem 1404, and determines if one or more counters are available. The wave controller 1430 returns an acknowledgment (ACK/NACK) signal that indicates whether the one or more counters are allocated responsive to the credit request and a credit signal that indicates a number of credits issued to the requesting entity. In some embodiments, the credit signal comprises writing a value (e.g., incrementing a count) in a shared memory or memory mapped register that is accessible to software executing in each of the cores 1402 and/or the memory subsystem 1404. The ACK/NACK signal can be written to a separate memory location, which may or may not be shared. For example, the credit request sent by a particular core 1402 can include a pointer to a location in the memory, either a local memory limited to a particular core 1402 or a shared memory accessible by more than one core 1402, and the wave controller 1430 can write a value to the memory location indicated by the pointer that indicates whether the counter was allocated successfully. In response to receiving the ACK/NACK signal, the program can load a value from the shared memory or memory mapped register to read the number of credits that were issued in response to the request. The collective communication primitives can then be issued to the ATS agent 1440 via the NoC 1410 if a credit is available.

In some embodiments, the ACK/NACK signal is omitted and the requesting entity simply polls the shared memory location or the memory mapped register periodically to determine whether the credits were issued. If the requesting entity detects a change in the value stored at the memory address, then the requesting entity is permitted to inject one or more collective communication primitives into the network 100 that correspond to said credits. In an embodiment, each credit corresponds to an address for a collective communication primitive, and the collective communication primitives must be issued in an ascending order such that the value of the credit is related to the total number of collective communication primitives that have been issued to the network. In another embodiment, each credit corresponds to a particular wave of collective communication primitives such that one credit corresponds to multiple collective communication primitives. In yet another embodiment, each credit can be used for any collective communication primitive or wave of collective communication primitives, and the requesting entity is configured to manage allocation of credits to particular waves based on priority of said waves. It will be appreciated that any technically feasible solution for allocating credits to specific collective communication primitives, based on priority or other scheduling mechanism, is within the scope of the present disclosure.

Figure 15:
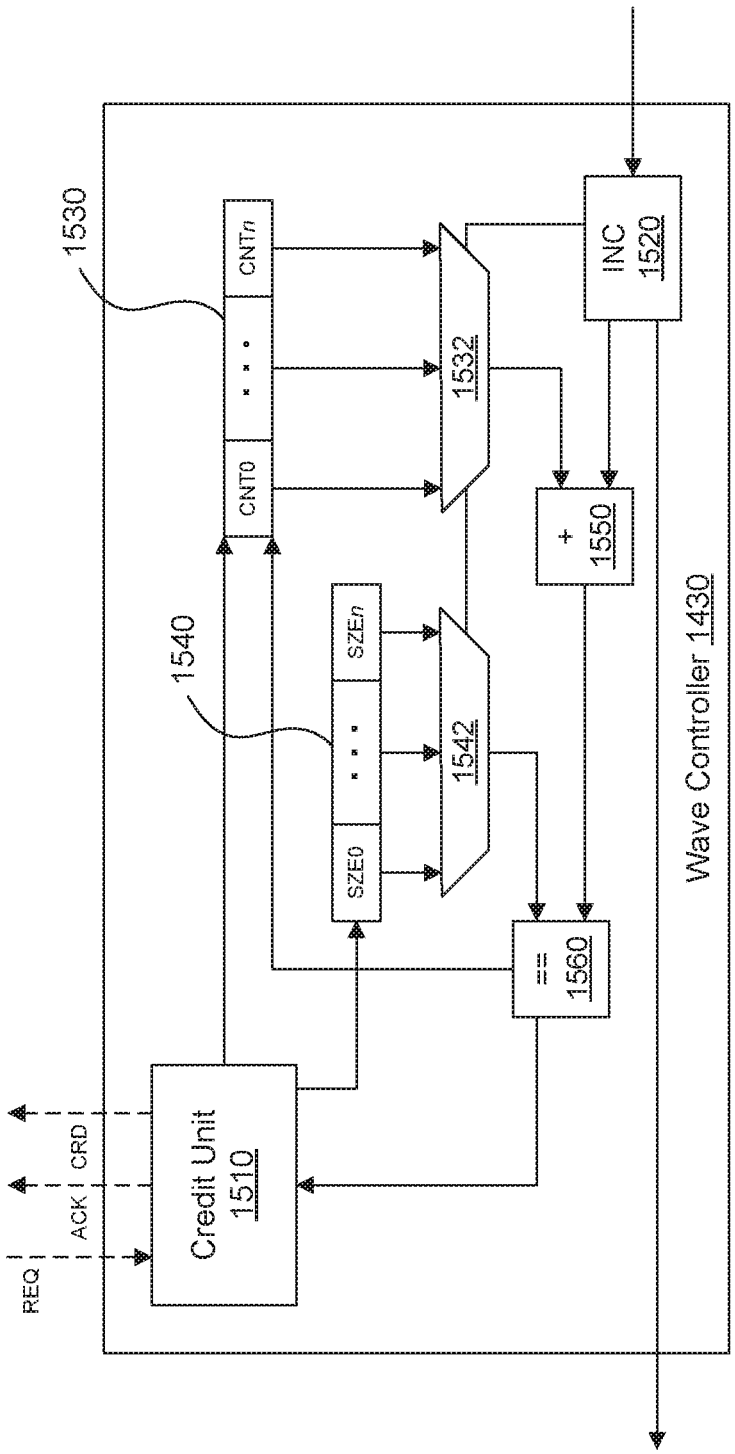
FIG. 15 illustrates the wave controller of FIG. 14, in accordance with some embodiments.

FIG. 15 illustrates the wave controller 1430 of FIG. 14, in accordance with some embodiments. As depicted in FIG. 15, the wave controller 1430 includes a credit unit 1510. The credit unit 1510 manages allocation of counters stored in a counter register 1530 to be used for tracking progress of one or more waves. The counter register 1530 can include a plurality of counters. For example, each counter can be, e.g., eight bits in width allowing a wave to correspond with up to 255 distinct collective communication primitives. In practice, waves are typically smaller than 255 collective communication primitives; however, in various embodiments, the bit width of each counter can be less than or greater than eight bits.

Each counter is paired with a corresponding size value in a size register 1540. The credit unit 1510 receives a credit request to allocate a counter to a wave from, e.g., the offload engine 1420 of FIG. 14. The credit request indicates a size of the wave. Alternatively, the size of the wave is preset or set by the fabric manager. The credit unit 1510 determines if a counter is available by, e.g., reading a value of the counter to check a MSB. If the MSB is a zero, then the counter is available and can be allocated to a wave. However, if the MSB is a one, then the counter is allocated to a different wave that is still in the network 100. If any counter is available, then the credit unit 1510 allocates that counter for the wave and updates a corresponding size value in the size register 1540 with the size of the wave. The size of the wave can be included in the credit request from the requesting entity. If the allocation is successful, then the credit unit 1510 sends an acknowledgment (ACK) signal and issues one or more credits to the requesting entity (e.g., the offload engine 1420). If the allocation is not successful, then the credit unit 1510 sends a negative acknowledgment (NACK) signal to the requesting entity and does not issue credits to the requesting entity. In one embodiment, the counter value is initialized to zero (except for the MSB, which is initialized to one). It will be appreciated that, in other embodiments, any other technically feasible means for determining whether a counter is allocated or free can be utilized including, but not limited to, using a different bit of the counter as a bit flag indicating availability, switching the meaning of the value of the bit flag, or specifying a special value (e.g., 255) of the counter to indicate the counter is available.

After credit(s) have been issued to the requesting entity, the wave of collective communication primitives may be injected into the network. One or more collective communication primitives can be in-flight in the network 100 at a time. The wave controller 1430 monitors the data packets received by the receiver 1460 in order to count the number of responses received for each wave. An increment unit 1520 inspects each data packet and determines if the data packet is a response packet associated with a collective communication primitive. If the packet is a response packet, then the increment unit 1520 determines which wave corresponds to the response packet. In an embodiment, a wave identifier is derived from an address included in the response packet. Although not explicitly shown in FIG. 15, the wave identifier can be mapped to an allocated counter identifier in a table, which is set when the counter is allocated by the credit unit 1510. The increment unit 1520 identifies the counter in the counter register 1530 based on the counter identifier read from the table and configures the multiplexor 1532 to read the appropriate count value from the counter register 1530. The output from the multiplexor 1532 is then provided to a sum unit 1550 along with an increment signal from the increment unit 1520 to increment the count value by one. The updated count value is then passed to a comparison unit 1560 that compares the count value to a corresponding size value stored in the size register 1540. Again, the increment unit 1520 configures a multiplexor 1542 to read the appropriate size value, based on the counter identifier mapped to the wave identifier in the table, from the size register 1540.

If the count value is equal to the size value, then all responses for the wave have been received and the counter for the wave can be freed. In other words, once the counter hits an expected value, then no additional responses should be expected to be received at the endpoint and the processing of the wave is complete. However, if the count value is less than the size value, then additional responses are expected to be received by the endpoint and the new updated count value is rewritten to the counter register 1530.

In this manner, the wave controller 1430 tracks the number of responses received at the endpoint for each wave. Once all of the expected responses for the wave have been received, the wave controller 1430 frees a counter so that another wave can be injected into the network 100 (i.e., new credits can be issued when the counter is re-allocated to a different wave). As shown in FIG. 15, the collective communication primitive received at the increment unit 1520 is also forwarded to the NoC 1410 to be directed to the appropriate destination unit (e.g., cores 1402 or memory subsystem 1404). Thus, the wave controller 1430 does not block the data packets received by the endpoint 1400 but merely inspects the data packets to count the number of responses received by the endpoint 1400 in order to implement the injection limiting policy using a system of credits.

In some embodiments, it will be appreciated that the function of the wave controller 1430 can be implemented using a different architecture. For example, as a counter is allocated to a wave, the counter can be initialized to store a size value included in the request. The counter can then be decremented with each arriving response for the wave until the count value reaches zero, at which point the wave is complete and the counter is freed. In such embodiments, a second register can be used to store a wave identifier to map the wave to a particular counter in the counter register. It will be appreciated that any logic or number of registers or other means to count responses received at the network interface of the endpoint 1400 can be utilized to implement the injection limiting policy for collective communication primitives and is within the scope of the present disclosure.

Figure 16:
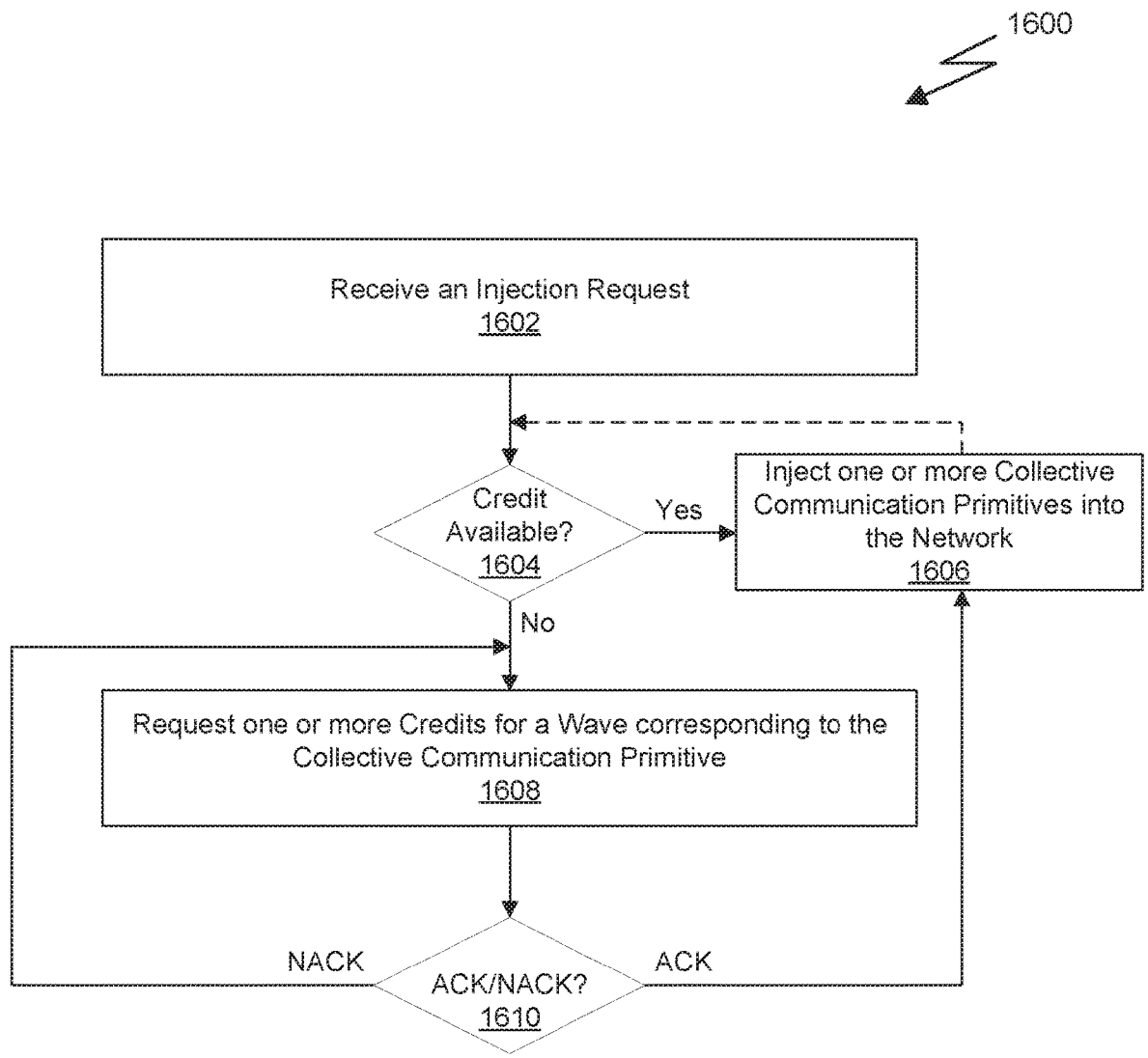
FIG. 16 is a flow diagram of a method for limiting injection of collective communication primitives into a network, in accordance with some embodiments.

FIG. 16 is a flow diagram of a method 1600 for limiting injection of collective communication primitives into a network, in accordance with some embodiments. In an embodiment, the method 1600 is performed by an offload engine 1420 included in an endpoint 1400 connected to the network.

At step 1602, an offload request is received at the offload engine 1420. In an embodiment, the offload request corresponds to one or more collective communication primitives to be injected into the network 100. For example, the offload request can indicate that a number of reduction requests should be injected into the network.

At step 1604, it is determined whether the collective communication primitive(s) for the offload request can be injected into the network based on allocated credits. If credits for a wave of one or more collective communication primitives were previously allocated by a wave controller 1430, then, at step 1606, one or more collective communication primitives for the wave can be injected into the network 100. If there are no more waves corresponding to the offload request, then the method 1600 completes. However, if the offload request includes additional waves of collective communication primitives, then the method 1600 returns to step 1604 to determine if there are enough credits for the next wave. However, at step 1604, if credits for the next wave are not available, then the method 1600 proceeds to step 1608 to attempt to attain one or more credits that allows the wave to be injected into the network 100.

At step 1608, a credit request is generated and transmitted to the wave controller 1430. In an embodiment, the wave controller 1430 maintains a number of counters that can be allocated to one or more waves of collective communication primitives in order to track responses to the collective communication primitives received from the network 100. Upon receiving the credit request, the wave controller 1430 attempts to allocate one of the counters to the wave in order for the collective communication primitive(s) associated with the wave to be injected into the network 100. In some embodiments, the requesting entity (e.g., the offload engine 1420) can request credits for two or more waves to be allocated via a single credit request. The wave controller 1430 may issue the credits only when at least as many counters can be allocated corresponding to the two or more waves.

At step 1610, an ACK/NACK signal is received in response to the credit request that indicates whether the credits were issued (i.e., successfully allocated to the requesting entity). In an embodiment, an ACK signal is received when the credits will be issued to allow the collective communication primitives for a wave to be injected into the network 100. Otherwise, a NACK signal is received when the credits cannot be issued due to the lack of available counters in the wave controller. If a NACK signal is received, then the method 1600 can return to step 1608, after a period of time, and retry the credit request.

If an ACK signal is received, then, the method returns to step 1606, where the one or more collective communication primitives for the wave are injected into the network 100 using the available credit. All collective communication primitives associated with that particular wave can be injected into the network 100 without requiring new credits to be attained, as the wave controller 1430 is configured to issue a number of credits corresponding to the size of the wave for each credit request received by the wave controller 1430.

It will be appreciated that the method 1600 can be repeated each time a new offload request is received by the offload engine 1420.

Figure 17:
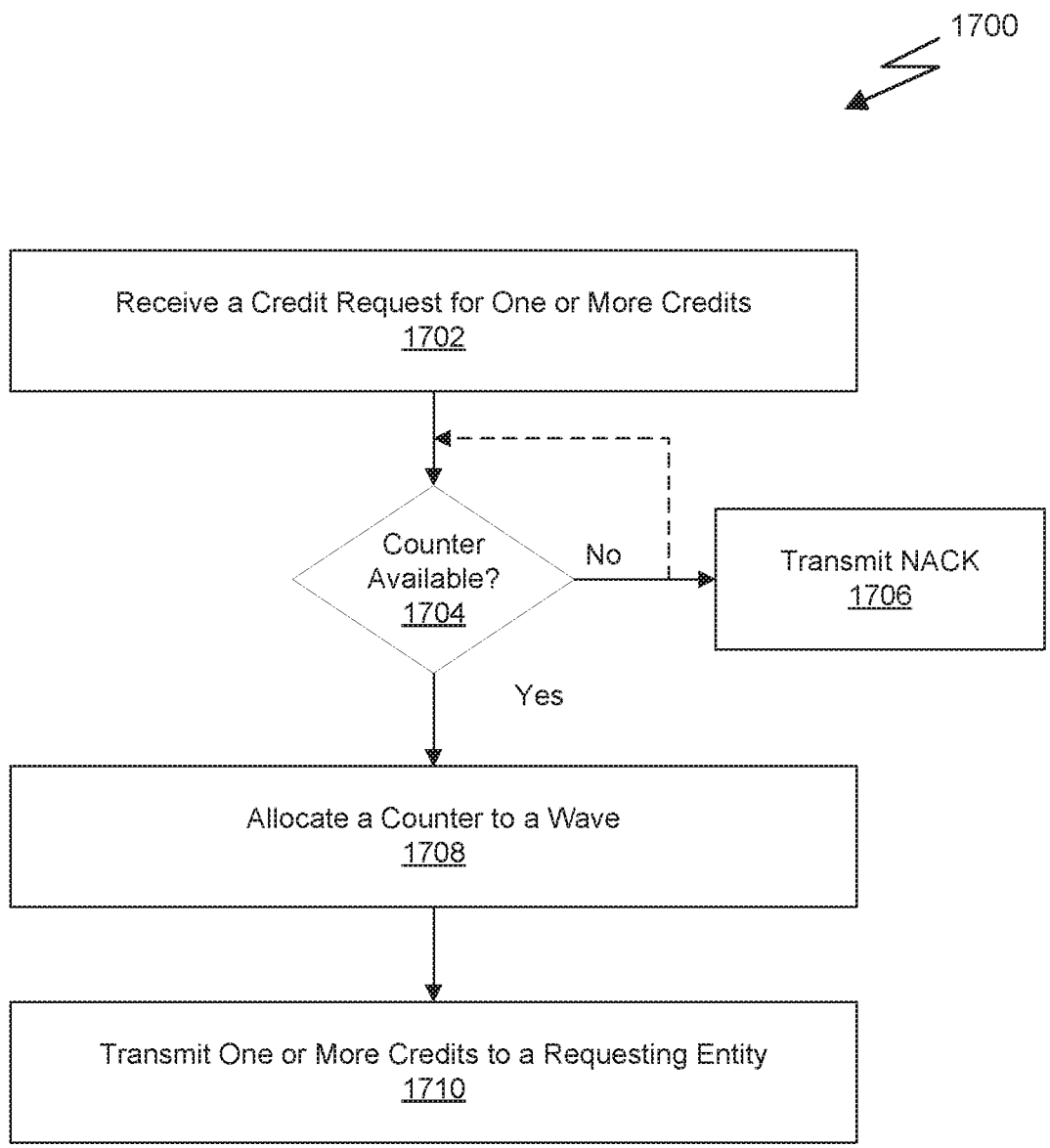
FIG. 17 is a flow diagram of a method for limiting injection of collective communication primitives into a network, in accordance with some embodiments.

FIG. 17 is a flow diagram of a method 1700 for limiting injection of collective communication primitives into a network, in accordance with some embodiments. In an embodiment, the method 1700 is performed by a wave controller 1430 included in an endpoint 1400 connected to the network.

At step 1702, a credit request is received by a wave controller 1430. In an embodiment, the endpoint 1400 is prevented from injecting new collective communication primitives into the network 100 prior to obtaining one or more credits from the wave controller 1430 that permits the endpoint to inject one or more collective communication primitives for a wave into the network.

At step 1704, the wave controller 1430 determines whether a counter is available. In an embodiment, the wave controller 1430 inspects the MSB of one or more counters to determine, based on a level of the bit (e.g., 0 or 1) whether the counter is available or allocated to a different wave in-flight within the network 100. If a counter is not available, then the wave controller 1430 can store the request in a temporary memory for a period of time while waiting for a counter to be freed (e.g., for a wave to be completed). Alternatively, the method 1700 can proceed to step 1706, where a NACK signal is transmitted to a requesting entity indicating that a credit is not issued because the counter is not available and the method 1700 terminates.

Returning to step 1704, if a counter is available, then, at step 1708, the counter is allocated to the wave. In an embodiment, the counter is configured to count a number of responses corresponding to the one or more collective communication primitives for the wave received by the endpoint 1400. The credit request can include a wave identifier and a size of the wave. The counter can be set to an initial value. In an embodiment, the counter is set to zero and a second register is set to store the size of the wave corresponding to the counter. The counter will be incremented each time a response corresponding to the wave is received until the counter has a value that matches the size of the wave. In another embodiment, the counter is set to the size of the wave. The counter will be decremented each time a response corresponding to the wave is received until the counter has a value equal to zero.

At step 1710, one or more credits are transmitted to the requesting entity to enable the wave to be injected into the network 100.

Figure 18:
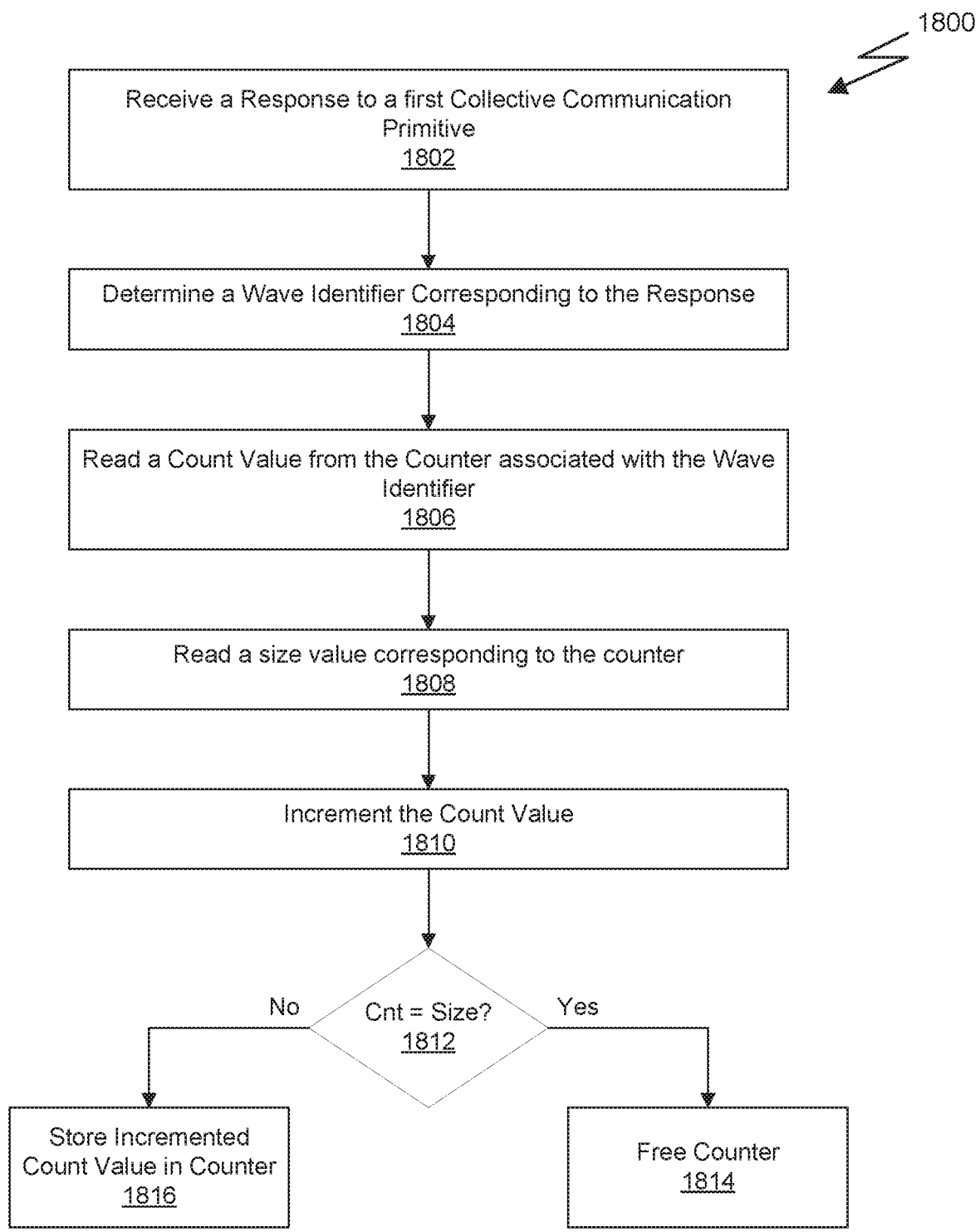
FIG. 18 is a flow diagram of a method for tracking responses for a wave of collective communication primitives received at a network interface, in accordance with some embodiments.

FIG. 18 is a flow diagram of a method 1800 for tracking responses for a wave of collective communication primitives received at a network interface, in accordance with some embodiments. In an embodiment, the method 1600 is performed by a wave controller 1430 included in an endpoint 1400 connected to the network.

At step 1802, a response to a first collective communication primitive is received from the network.

At step 1804, a wave identifier corresponding to the response is determined. In an embodiment, the wave identifier can be read from a header of the response. In another embodiment, a wave identifier can be derived from an address included in the response.

At step 1806, a count value is read from the counter associated with the wave identifier. In an embodiment, the count value is read from a counter register storing a plurality of counters for a plurality of waves that can be in-flight in the network 100 simultaneously.

At step 1808, a size value corresponding to the counter is read. In an embodiment, the size value can be read from a size register storing a plurality of size values for different waves in-flight in the network 100.

At step 1810, the count value is incremented. At step 1812, the incremented count value is compared to the size value. If the incremented count value is equal to the size value, then, at step 1814, the counter is freed as the wave is complete. However, if the incremented count value is less than the size value, then, at step 1816, the incremented count value is stored in the counter.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A method for allocating credits to a requesting entity that enable one or more collective communication primitives for a wave to be injected into a network, the method comprising:
   receiving, at a wave controller of an endpoint, a credit request for one or more credits to be allocated to the requesting entity;
   allocating, by the wave controller, a counter configured to count a number of responses corresponding to the one or more collective communication primitives received by the endpoint; and
   transmitting the one or more credits to the requesting entity,
   wherein each collective communication primitive comprises a data packet that specifies an in-network operation, the in-network operation comprises a computation performed in a network device connected between two or more endpoints in the network, and the computation is based on a plurality of values received from at least two of the two or more endpoints.

2. The method of claim 1, wherein the wave includes a plurality of collective communication primitives, and a size of the wave is determined based on a number of collective communication primitives associated with an offload request and a maximum size of the wave.

3. The method of claim 1, wherein the wave controller includes a counter register that stores a plurality of counters corresponding to a plurality of waves that can be injected into the network sequentially such that the plurality of waves are distributed to endpoints of the network simultaneously.

4. The method of claim 3, wherein the wave controller further includes a size register that stores a plurality of size values corresponding to the plurality of counters, wherein each size value is compared against a count value stored in a corresponding counter to determine whether a particular wave allocated to the counter is complete.

5. The method of claim 1, wherein the collective communication primitive specifies a reduction operation performed by a network entity and configured to reduce a plurality of values from two or more endpoints associated with the collective communication primitive based on a specified operator.

6. The method of claim 1, wherein the requesting entity is an offload engine connected to a network on chip (NoC), the endpoint further comprising one or more processing cores and a memory subsystem, and wherein the offload engine generates the one or more collective communication primitives and injects the one or more collective communication primitives to the network via the NoC, and wherein the offload engine is a hardware unit that includes at least one counter storing a credit value.

7. The method of claim 1, the method further comprising:
receiving a response to a first collective communication primitive from the network;
determining a wave identifier corresponding to the response;
reading a count value from the counter associated with the wave identifier;
reading a size value corresponding to the counter;
incrementing the count value; and
comparing the incremented count value to the size value, wherein, based on the comparison:
the counter is freed, or
the incremented count value is stored in the counter.

8. The method of claim 1, wherein the requesting entity is configured to prevent injection of a second wave of one or more additional collective communication primitives into the network until at least one or more additional credits are received from the wave controller.

9. An apparatus configured to generate collective communication primitives for performing computations in a network, the apparatus comprising:
a network interface; and
a wave controller connected to the network interface and configured to:
receive a credit request for one or more credits to be allocated to a requesting entity, wherein the one or more credits enable one or more collective communication primitives for a wave to be injected into the network via the network interface,
allocate a counter configured to count a number of responses corresponding to the one or more collective communication primitives received from the network via the network interface, and
transmit the one or more credits to the requesting entity,
wherein each collective communication primitive comprises a data packet that specifies an in-network operation, the in-network operation comprises a computation performed in a network device connected between two or more endpoints in the network, and the computation is based on a plurality of values received from at least two of the two or more endpoints.

10. The apparatus of claim 9, further comprising:
a network on a chip (NoC) connected to the network interface; and
an offload engine connected to the NoC and configured to generate the one or more collective communication primitives for the wave and transmit the one or more collective communication primitives to the NoC,
wherein the offload engine is a hardware unit that includes at least one counter storing a credit value, and wherein the offload engine determines whether to inject the one or more collective communication primitives into the network based on available credits, and wherein the offload engine is the requesting entity.

11. The apparatus of claim 10, wherein the wave includes a plurality of collective communication primitives, and a size of the wave is determined by the offload engine based on a number of collective communication primitives associated with an offload request and a maximum size of the wave.

12. The apparatus of claim 9, wherein the wave controller includes a counter register that stores a plurality of counters corresponding to a plurality of waves that can be injected into the network sequentially such that the plurality of waves are distributed to endpoints of the network simultaneously.

13. The apparatus of claim 12, wherein the wave controller further includes a size register that stores a plurality of size values corresponding to the plurality of counters, wherein each size value is compared against a count value stored in a corresponding counter to determine whether the wave allocated to the counter is complete.

14. The apparatus of claim 9, wherein the collective communication primitive comprises a reduction operation configured to reduce a plurality of values from two or more endpoints associated with the collective communication primitive based on a specified operator.

15. The apparatus of claim 9, wherein the wave controller is further configured to:
receive a response to a first collective communication primitive from the network;
determine a wave identifier corresponding to the response;
read a count value from the counter associated with the wave identifier;
read a size value corresponding to the counter;
increment the count value; and
compare the incremented count value to the size value, wherein, based on the comparison:
the counter is freed, or
the incremented count value is stored in the counter.

16. A non-transitory computer readable media storing instruction that, when executed by a processor, cause the processor to perform a series of steps comprising:
receiving a credit request for one or more credits to be allocated to a requesting entity, wherein the one or more credits enable one or more collective communication primitives for a wave to be injected into a network;
allocating a counter configured to count a number of responses corresponding to the one or more collective communication primitives received from the network; and
transmitting the one or more credits to the requesting entity,
wherein each collective communication primitive comprises a data packet that specifies an in-network operation, the in-network operation comprises a computation performed in a network device connected between two or more endpoints in the network, and the computation is based on a plurality of values received from at least two of the two or more endpoints.

17. The non-transitory computer readable media of claim 16, wherein the counter is stored in a counter register that stores a plurality of counters corresponding to a plurality of waves that can be simultaneously injected into the network.

18. The non-transitory computer readable media of claim 16, the steps further comprising:
   receive a response to a first collective communication primitive from the network;
   determine a wave identifier corresponding to the response;
   read a count value from the counter associated with the wave identifier;
   read a size value corresponding to the counter;
   increment the count value; and
   compare the incremented count value to the size value, wherein, based on the comparison:
      the counter is freed, or
      the incremented count value is stored in the counter.

19. A method of operating an endpoint, the endpoint coupled to a network that includes a plurality of endpoints and a shared address space, the method comprising:
   defining one or more multicast regions in the shared address space;
   administering an injection policy for the endpoint by issuing at least one credit that enables the endpoint to inject push requests and/or pull requests for addresses included in the one or more multicast regions, thereby limiting an amount of collective communication primitives being simultaneously injected into the network,
   wherein each collective communication primitive comprises a data packet that specifies an in-network operation, the in-network operation comprises a computation performed in a network device connected between two or more endpoints in the network, and the computation is based on a plurality of values received from at least two of the two or more endpoints.

* * * * *